United States Patent
Sakr et al.

(10) Patent No.: US 10,670,810 B2
(45) Date of Patent: Jun. 2, 2020

(54) POLARIZATION SELECTIVE COUPLER

(71) Applicants: Ahmed A. Sakr, Verdun (CA); Walid M. G. Dyab, Montreal (CA); Ke Wu, Montreal (CA)

(72) Inventors: Ahmed A. Sakr, Verdun (CA); Walid M. G. Dyab, Montreal (CA); Ke Wu, Montreal (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 128 days.

(21) Appl. No.: 15/853,312

(22) Filed: Dec. 22, 2017

(65) Prior Publication Data

US 2019/0196107 A1 Jun. 27, 2019

(51) Int. Cl.
| | |
|---|---|
| *G02B 6/28* | (2006.01) |
| *G02B 6/42* | (2006.01) |
| *H01Q 13/02* | (2006.01) |
| *H01Q 19/13* | (2006.01) |
| *H01Q 13/08* | (2006.01) |
| *H01P 1/161* | (2006.01) |
| *H01P 5/04* | (2006.01) |
| *H01P 5/18* | (2006.01) |
| *H01Q 25/00* | (2006.01) |
| *G02B 6/122* | (2006.01) |
| *H01Q 3/40* | (2006.01) |

(52) U.S. Cl.
CPC ......... *G02B 6/2821* (2013.01); *G02B 6/4291* (2013.01); *H01P 1/161* (2013.01); *H01P 5/04* (2013.01); *H01P 5/182* (2013.01); *H01Q 13/02* (2013.01); *H01Q 13/0208* (2013.01); *H01Q 13/0258* (2013.01); *H01Q 13/08* (2013.01); *H01Q 19/136* (2013.01); *H01Q 25/001* (2013.01); *G02B 6/122* (2013.01); *H01Q 3/40* (2013.01)

(58) Field of Classification Search
CPC .... G02B 6/2821; G02B 6/4291; G02B 6/122; H01Q 13/0208; H01Q 13/08; H01Q 19/136; H01P 1/161
See application file for complete search history.

(56) References Cited

U.S. PATENT DOCUMENTS

2015/0194718 A1* 7/2015 Kildal ................. H01P 3/12
333/137

OTHER PUBLICATIONS

M. Esquius-Morote et al., "Orthomode Transducer and Dual-Polarized Horn Antenna in Substrate Integrated Technology", IEEE Transactions on Antennas and Propagation, vol. 62, No. 10, pp. 4935-4944, Oct. 2014.

(Continued)

*Primary Examiner* — Robert J Pascal
*Assistant Examiner* — Kimberly E Glenn

(57) ABSTRACT

A dual polarized waveguide device includes a first waveguide that defines a first linear signal propagation path, a second waveguide that defines a second linear signal propagation path that is parallel to the first linear signal propagation path, and a polarization selective coupling interface coupling the first and second waveguides, the polarization selective coupling interface being configured to enable horizontally polarized signals to pass between the first and second linear propagation paths and prevent vertically polarized signals from passing between the first and second linear propagation paths.

20 Claims, 16 Drawing Sheets

(56) References Cited

OTHER PUBLICATIONS

A. Navarrini et al., "Symmetric Reverse-Coupling Waveguide Orthomode Transducer for the 3-mm Band", IEEE Transactions on Microwave Theory and Techniques, vol. 57, No. 1, pp. 80-88, Jan. 2009.
C. Yeh et al., "Accuracy of directional coupler theory in fiber or integrated optics applications", J. Opt. Soc. Am., vol. 68, No. 8, pp. 1079-1083, Aug. 1978.
U. Rosenberg et al., "A New Waveguide Directional Coupler/Hybrid Type-Favorably Suited for Millimeter Wave Application", IEEE MTT-S Int. Microw. Symp. Dig., 2000, pp. 1311-1314, vol. 3.

* cited by examiner

POLARIZATION SELECTIVE COUPLER

FIELD

The present application relates to microwave devices, in particular, to dual polarized microwave devices.

BACKGROUND

Wireless communications devices, such as user equipment (UEs) or base stations, communicate wireless signals through propagation of electromagnetic waves in air. Due to reflection, refraction, and diffraction along the propagation path of the electromagnetic waves, the direction of an electric field vector of the wave often varies. Each wave may be decomposed into two orthogonal components or polarizations, such as vertical and horizontal polarizations. The term "polarization" refers to the direction of the electric field. In the context of waveguides, each polarization may have several modes. Waveguide modes are typically identified as transverse electric (TE) modes with integers after them: e.g. $TE_{m,n}$. The numerals M and N are always integers that can take on separate values from 0 or 1 to infinity. These indicate the wave modes within the waveguide. Only a limited number of different m, n modes can be propagated along a waveguide dependent upon the waveguide dimensions and format. In the context of rectangular waveguides, for each waveguide mode there is a definite lower frequency limit. This is known as the cut-off frequency. Below this frequency no signals can propagate along the waveguide. As a result the waveguide can be seen as a high pass filter. It is possible for many waveguide modes to propagate along a waveguide. The number of possible modes for a given size of waveguide increases with the frequency. There is only one possible mode, called the dominant mode, for the lowest frequency that can be transmitted. It is the dominant mode in the waveguide that is normally used. For rectangular waveguides, the $TE_{10}$ mode of propagation is the lowest mode that is supported. Conventionally, for rectangular waveguides, the width, i.e. the widest internal dimension of the cross section, determines the lower cut-off frequency and is equal to ½ wavelength of the lower cut-off frequency. For rectangular waveguides, the $TE_{01}$ mode occurs when the height equals ½ wavelength of the cut-off frequency.

Linearly polarized waves that include vertical and horizontal polarization components are commonly used in wireless communications systems. Some wireless communications devices have antennas that are only able to use a single component, typically the vertical polarization. The other component, such as horizontal polarization, cannot be received and processed at the receiver and is therefore lost.

Accordingly, the signal power represented in the unused polarization is wasted. In order to meet the signal strength required at a receiving device, transmitting devices typically increase their transmitting power to compensate for the wasted signal power at the receiving end. This in turn results in inefficient use of power at the transmitting device, and increases overall interference and noise level of the wireless communications network.

Some wireless communications devices can use two orthogonally polarized antennas that are aligned to receive two orthogonal polarizations. However, due to the size limitation, these antennas are difficult to implement in mobile devices such as handsets.

Existing microwave devices that allow handling dual-polarized signals are structurally complicated and space consuming. For example, conventional cross-polarized (X-pol) orthomode transducers (OMTs) in millimeter wave bands, such as turnstile junction OMT and Atacama Large Millimeter Array OMT, typically have a large non-planar profile and thus take up a large 3 dimensional space and are difficult to integrate into a printed circuit board (PCB).

Therefore, it is desirable to provide microwave devices that can process both orthogonal components of a polarized wave using a planar structure, and that can be effectively integrated into a PCB.

SUMMARY

According to an example aspect, a dual polarized waveguide device is described. The dual polarized waveguide device includes a first waveguide that defines a first linear signal propagation path, a second waveguide that defines a second linear signal propagation path that is parallel to the first linear signal propagation path, and a polarization selective coupling interface coupling the first and second waveguides, the polarization selective coupling interface being configured to enable horizontally polarized signals to pass between the first and second linear propagation paths and prevent vertically polarized signals from passing between the first and second linear propagation paths. In at least some examples, the polarization selective coupling interface comprises a periodic perfect electrical conductor (PEC) wall.

In some examples, the device is an orthomode transducer (OMT) wherein cross-polarized mmW signals fed to the first waveguide are divided along the polarization selective coupling interface into vertically polarized mmW signals that are output from the first waveguide and horizontally polarized mmW signals that are output from the second waveguide. In some examples, horizontally polarized mmW signals that are fed to the second waveguide pass through the polarization selective coupling interface to combine with vertically polarized mmW signals fed to the first waveguide to form cross-polarized mmW signals that are output from the first waveguide. In some examples, the first waveguide and the second waveguide each include a dielectric substrate and the periodic PEC wall comprises a row of plated holes. The dielectric substrate of the first waveguide can have the same permittivity of the dielectric substrate of the second waveguide. In some examples, the polarization selective coupling interface further comprises a dielectric wall between the periodic PEC wall and one of the first waveguide and the second waveguide, the dielectric wall having a different permittivity than the dielectric substrate of the first waveguide and the dielectric substrate of the second waveguide.

In some examples of the first aspect, the waveguide device is formed from a planar printed circuit board (PCB).

In some examples of the first aspect, the periodic PEC wall has a length Lc of approximately 22.5 mm, and the periodic PEC wall is a row of conductive elements each having a diameter of approximately 0.2 mm and a periodic spacing of approximately 0.4 mm. In some examples, the waveguide device includes a cross-polarized antenna connected to excite the first waveguide.

In some examples, the waveguide device device is a planar phase shifting device, wherein the first waveguide feeds a first delay line curved waveguide section configured to phase shift signals passing therethrough and the second waveguide feeds a second delay line curved waveguide section configured to phase shift signals passing therethrough.

In some examples, the first waveguide and the second waveguide are hollow waveguides, and the periodic PEC wall comprises a row of pins.

In some examples of the first aspect, the waveguide device includes a second coupling interface coupling the first and second waveguides, the second coupling interface being configured to permit both horizontally polarized mmW signals and vertically polarized mmW signals to pass between the first and second linear propagation paths, the second coupling interface providing a coupling length of LcV for vertically polarized mmW signals between the first and second linear mmW signal propagation paths, and the second coupling interface and the polarization selective coupling interface collectively providing a coupling length of LcH for horizontally polarized mmW signals. In some examples, the second coupling interface contains no conductive barrier between the first and second waveguides. In some examples, the length LcH and the length LcV permit cross-polarized signals fed to the first waveguide to split into two cross-polarized signals for output from the first waveguide and the second waveguide and cross-polarized signals fed to the second waveguide to split into two cross-polarized signals for output from the first waveguide and the second waveguide. In some examples, the waveguide device is a cross coupling device, wherein the length LcH and the length LcV permit cross-polarized signals fed to the first waveguide to entirely or almost entirely couple from the first linear waveguide path to the second linear waveguide path for output from the second waveguide, and cross-polarized signals fed to the second waveguide to entirely or almost entirely couple from the second linear waveguide path to the first linear waveguide path for output from the first waveguide.

According to a further aspect of the invention is a method of guiding cross-polarized signals that includes guiding the cross-polarized signals in a first linear waveguide path that is parallel to a second linear waveguide path, and at an interface between the first linear waveguide path and the second linear waveguide path, permitting horizontally polarized signals of the cross-polarized signals to couple from the first linear waveguide path to the second linear waveguide path and preventing vertically polarized signals of the cross-polarized signals from coupling from the first linear waveguide path to the second linear waveguide path. In at least some examples, the permitting and the preventing are performed by a periodic perfect electrical conductor (PEC). In some examples, the guiding is performed by a dielectric substrate surrounded by conductive layers.

In some example the method includes, at a further interface between the first linear waveguide path and the second linear waveguide path, permitting both horizontally and vertically polarized signals of the cross-polarized signals to couple from the first linear waveguide path to the second linear waveguide path.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Certain microwave bands, such as the mm wave (mmW) band from 30 GHz to 300 GHz, may be more commonly used in future communications systems. The efficiency of mmW band communications can be enhanced through the use of dual-polarization handling devices that are capable of decomposing polarized waves into two orthogonal polarizations when receiving mmW signals and combining two orthogonal polarizations into a dual-polarized wave when transmitting mmW signals.

Figure 1:
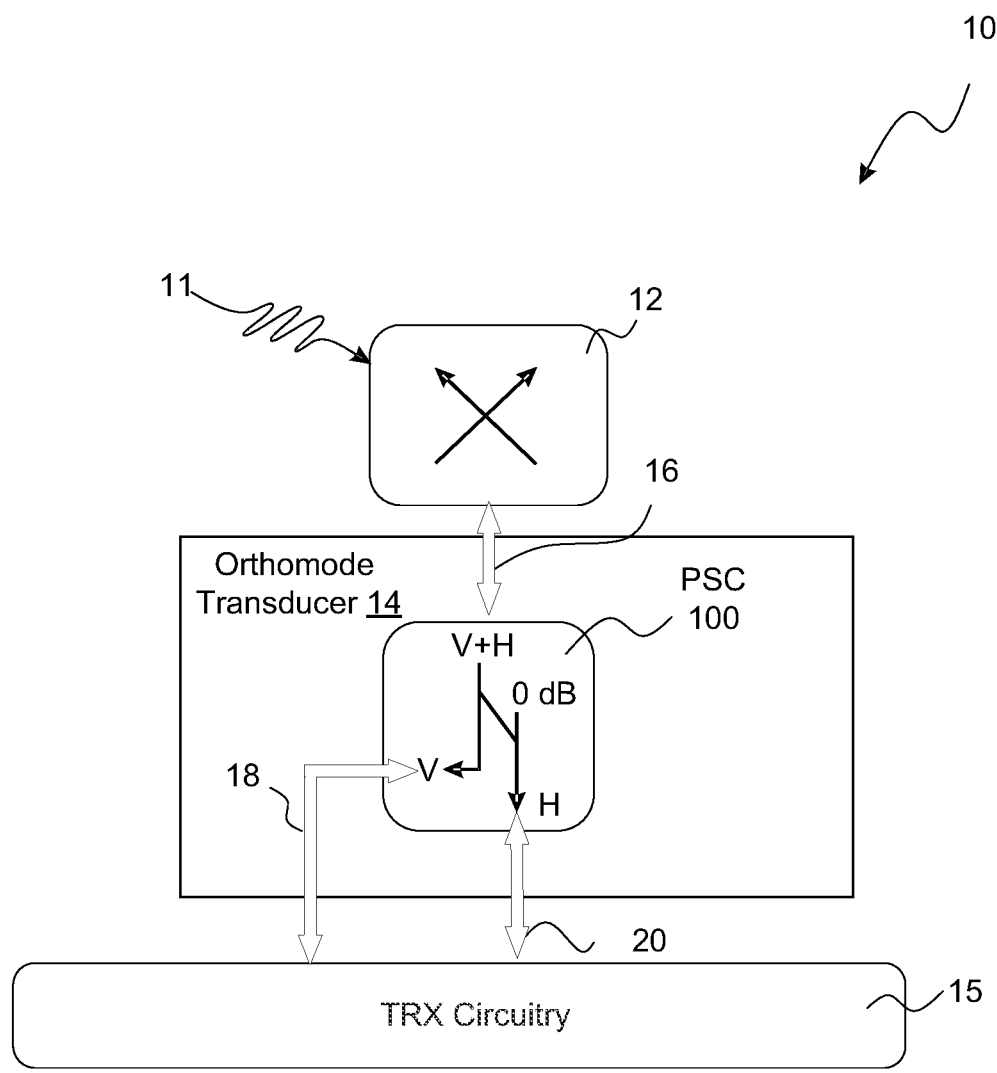
FIG. 1 is a block diagram illustrating a dual polarization handling system, according to example embodiments.

FIG. 1 is a block diagram illustrating a dual-polarization handling system 10 that may be used in a network element for transmitting and receiving mmW signals, according to example embodiments. Dual-polarization handling system 10 includes a dual or cross polarized (X-pol) antenna 12 in Ka-band (26.5 GHz-40 GHz), an Orthomode Transducer (OMT) 14, and a radio frequency (RF) transceiver (TRX) 15.

When the dual-polarization handling system 10 is used for receiving signals, X-pol antenna 12, which may for example be a square horn antenna (or a square dielectric resonator antenna), wirelessly receives mmW signals 11 of arbitrary polarization (including for example linearly, circularly, or elliptically polarized waves). The received mmW signals 11 are fed to OMT 14, which is a waveguide polarizer device having three physical waveguide sections 16, 18, 20 and a polarization selective coupler (PSC 100). Incoming mmW signals 11 are received by OMT 14 through waveguide section 16, and the PSC 100 of OMT 14 functions to decompose two spatially orthogonal signals within the same frequency band and simultaneously output one of the orthogonal signals at one waveguide section 18 and the other of the orthogonal signals at the other waveguide section 20. In the illustrated embodiments the two spatially orthogonal signals received through waveguide section 16 are vertically (V) polarized and horizontally (H) polarized, the signals output at waveguide section 18 are V-polarized and the signals output at waveguide section 20 are H-polarized.

In example embodiments, waveguide section 16 (also referred to as X-pol waveguide section 16) is a dielectric filled dual mode waveguide structure with a port 16a that interfaces with X-pol antenna 12. Waveguide section 18 (also referred to as V-pol waveguide section 18) is a dielectric filled vertical mode waveguide structure with a port 18a that interfaces with TRX circuitry 15. Waveguide section 20 (also referred to as H-pol waveguide section 20) is a dielectric filled horizontal mode waveguide structure with a port 20a that also interfaces with TRX circuitry 15. In example embodiments V-pol waveguide section 18 and H-pol waveguide section 20 physically couple OMT 14 to respective current conducting connectors (for example coaxial cable connectors) of mmW transceiver (TRX) circuitry 15.

When the dual-polarization handling system 10 is used to transmit signals, the OMT 14 receives V-polarized signals and H-polarized signals of the same frequency through V-pol waveguide section 18 and H-pol waveguide section 20, respectively, from TRX circuitry 15. OMT 14 combines the V and H-polarized signals into a dual polarized signal that is fed through X-pol waveguide section 16 to X-pol antenna 12 and transmitted into an unguided medium.

OMT

Figure 2A:
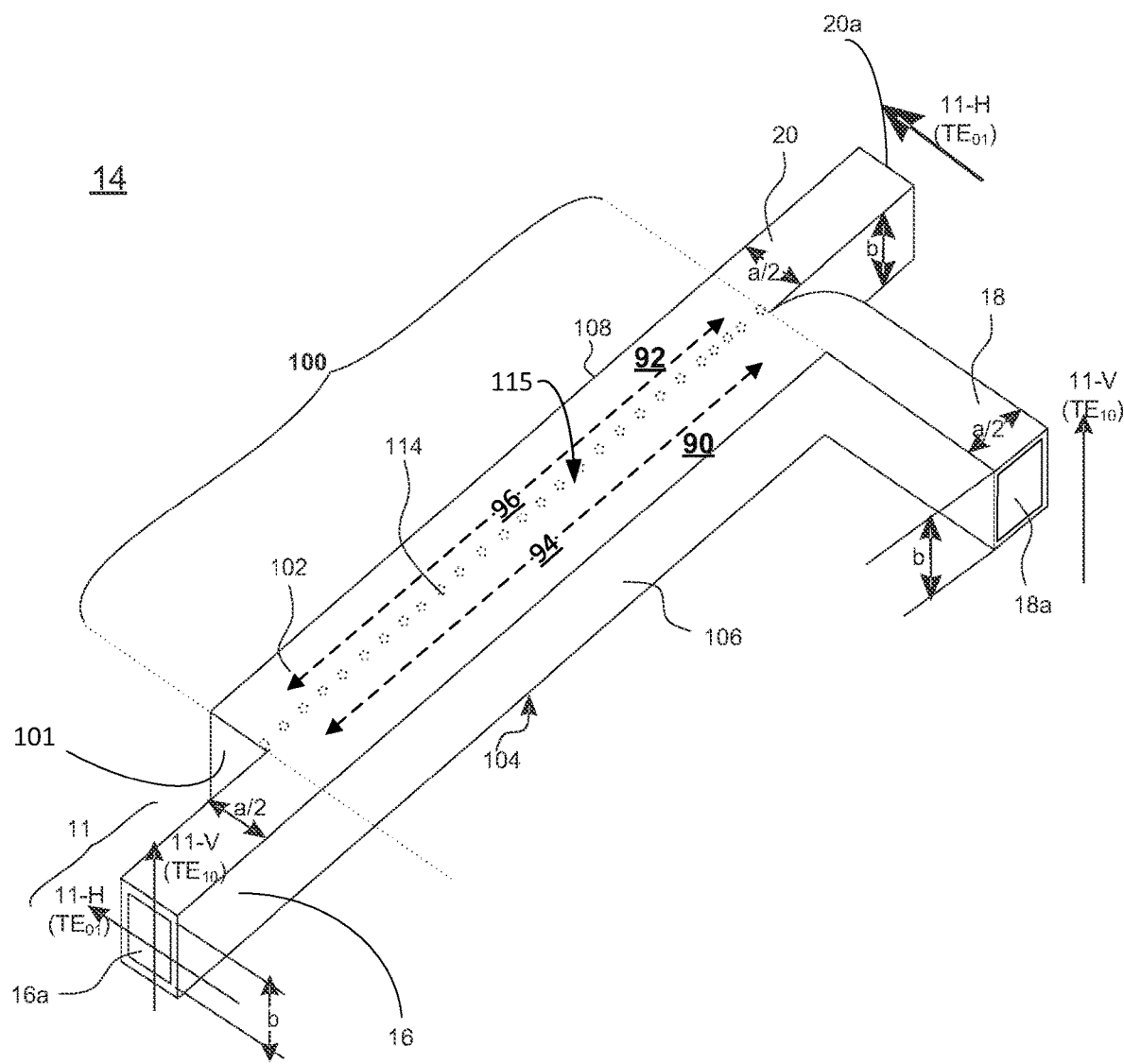
FIG. 2A is a perspective view of an orthomode transducer (OMT), according to example embodiments.
Figure 2B:
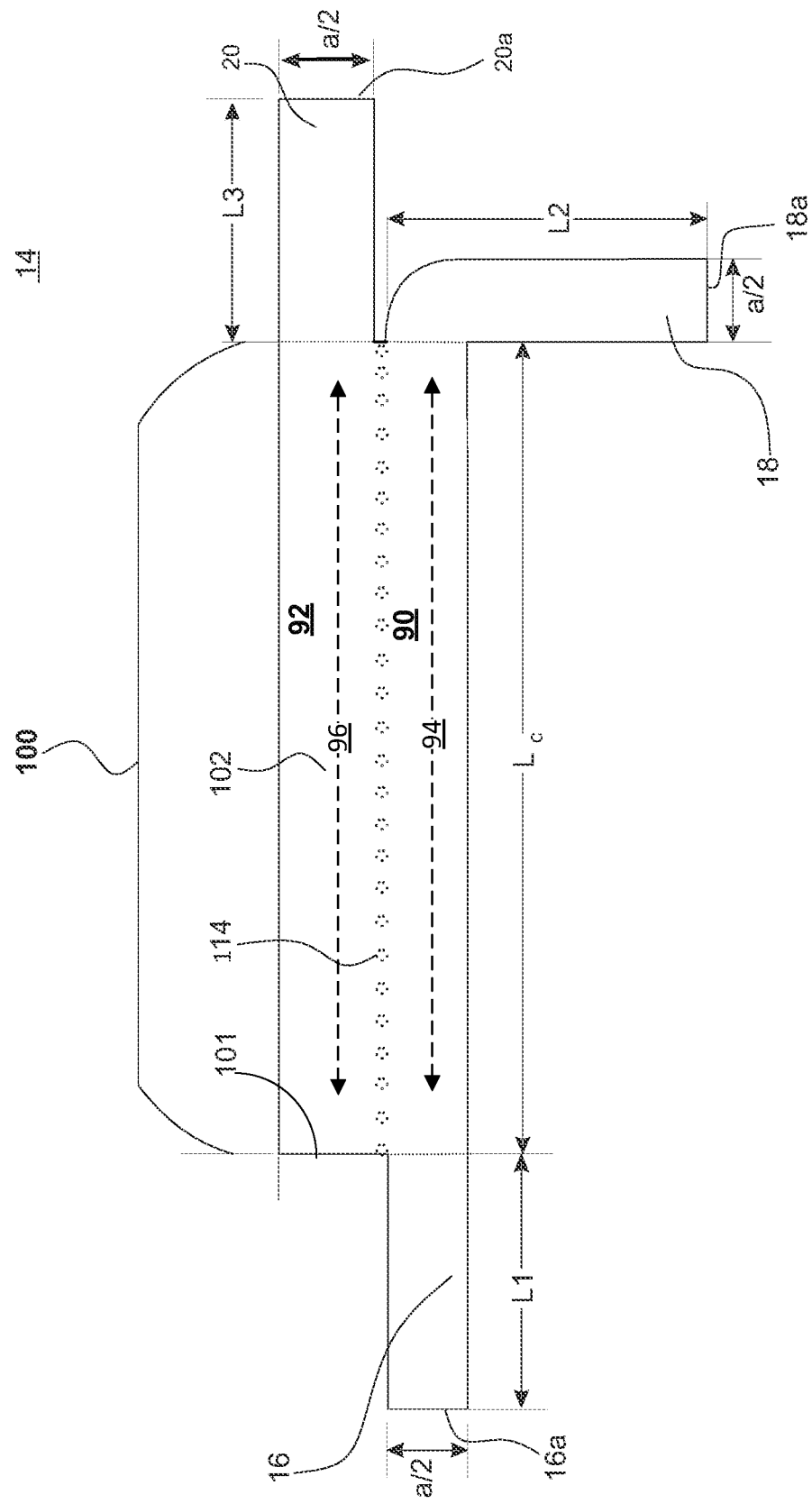
FIG. 2B is a top view of the OMT of FIG. 2A, according to example embodiments.

FIGS. 2A-2B illustrate a physical embodiment of OMT 14 according to example embodiments. In the illustrated embodiment, OMT 14 is a planar structure that is implemented using substrate integrated waveguide technology. PSC 100 is a component of OMT 14 and includes a first waveguide 90 and a second waveguide 92 that each define a respective linear propagation path 94, 96. First waveguide 90 and a second waveguide 92 and are physically arranged parallel to each other and joined by a polarization selective coupling interface 115 that has a length ($L_c$) and is parallel to the linear propagation paths 94, 96. In example embodiments, first waveguide 90 and second waveguide 92 are two different types of transmission lines coupled together. As will be explained in greater detail below, the coupling interface 115 between the first waveguide 90 and second waveguide 92 is polarization selective because only H-polarized signals can pass through the coupling interface 115 between the waveguides 90 and 92.

Figure 3A:
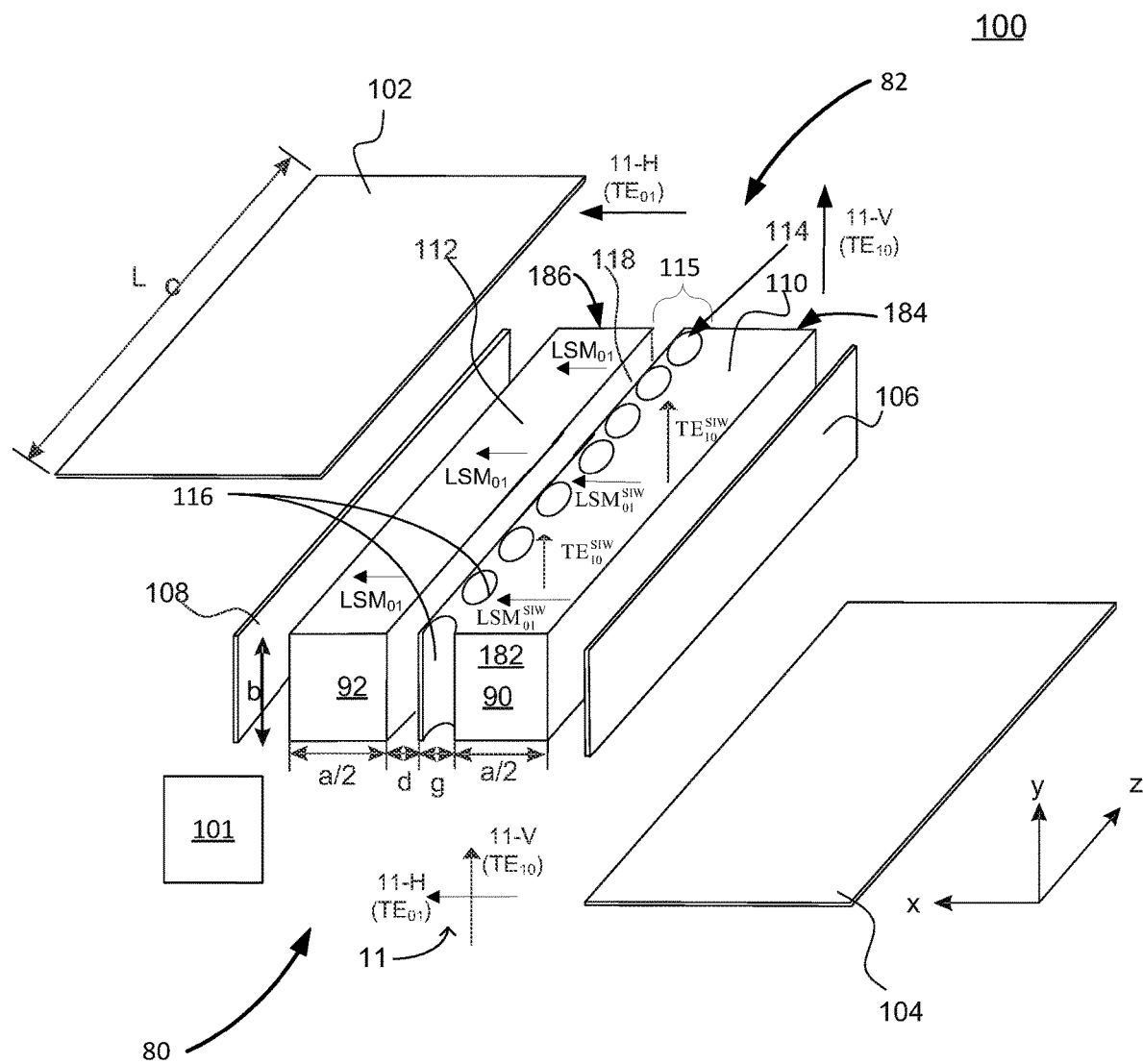
FIG. 3A is an exploded view of a Polarization Selective Coupler (PSC) that used in the OMT of FIG. 2A, according to example embodiments.

FIG. 3A shows an exploded perspective view of PSC 100 according to example embodiments. In FIG. 3A, an antenna facing end 80 of PSC 100 is located at the lower left of the drawing and a TRX circuitry facing end 82 is located at the upper right of the drawing. First waveguide 90 and second waveguide 92 include respective substrate sections 110 and 112 that respectively provide first linear propagation path 94 and second linear propagation path 96. Substrate sections 110 and 112 both have a permittivity $\varepsilon_r$ and are jointly enclosed by a rectangular conductive structure that includes metallic top layer 102, metallic bottom layer 104, and two metallic side wall layers 106 and 108. As can be seen in FIG. 3A, the substrate section 112 of the second waveguide 92 is bounded on three sides by metallic layers 102, 104 and 108 and on the fourth side by a dielectric wall 118 of width d. In the illustrated example, the dielectric wall 118 has a permittivity $\varepsilon_{eff}$ that is different than the permittivity $\varepsilon_r$ of substrate section 112. Accordingly, the second waveguide 92 represents an image-non-radiative dielectric (image-NRD) waveguide structure.

The substrate section 110 of first waveguide 90 is bounded on three sides by metallic layers 102, 104, 106. The side of the substrate section 110 of first waveguide 90 that faces the dielectric wall 118 incorporates a periodic perfect electric conductor (PEC) wall 114. The periodic PEC wall 114 includes a row of conductive elements 116 that extend through the substrate section 112 and that are each electrically connected at one end to the top metallic layer 102 and at an opposite end the bottom metallic layer 104. As will be explained in greater detail below, the periodic PEC wall 114 allows H-polarized signals to pass through the PEC wall, but forms a barrier that blocks V-polarized signals. Accordingly, the first waveguide 90 represents a hybrid image NRD-substrate integrated waveguide (image-NRD-SIW) structure.

The first waveguide 90 is connected with X-pol waveguide section 16 at an antenna-side end 80 and with V-pol waveguide section 18 at a TRX circuitry-side end 82. Unlike the first waveguide 90 which has waveguide sections 18, 20 at its opposite ends, the second waveguide 92 only has a single waveguide section, namely H-pol waveguide section 20 at TRX circuitry-side end 82. The opposite, antenna-side end 60 of the second waveguide 92 would not typically carry a signal, and as such it can end at a metallic layer 101. Any signals that enter or leave second waveguide 92 other than through H-pol waveguide section 20 do so through the periodic PEC wall 114 and air gap 118, which collectively form the coupling interface 115. In example embodiments, the dielectric material used for substrate sections 110 and 112, and the metallic layers 102, 104, 106, 108, extend beyond the PSC 100 to provide the wave guiding structures of waveguide sections 16, 18 and 20.

In an example embodiment, OMT 14 is constructed by laser cutting a printed circuit board (PCB) that includes a substrate layer and bottom conductive layer 104. The PCB can be laser cut to form the OMT profile shape shown in FIGS. 2A and 2B. A row of periodically spaced openings or vias can be cut through the PCB at the location of PEC wall 114. In some examples, the dielectric wall 118 is an air gap formed by laser cutting a slot of width d through the substrate layer along the length of the PSC 100, thereby also separating the substrate layer into respective substrate sections 110, 112. Conductive top and side layers 102, 106, 108 are applied to the resulting structure, and conductive plating applied to the vias to form conductive elements 116. Accordingly, in some examples the conductive elements 116 are plated holes or vias. In some examples the conductive elements 116 are pins. In some examples, a dielectric other than air can be used to form the dielectric wall 118.

As illustrated in FIG. 3A, the rectangular substrate sections 110 and 112 each have a coupling length $L_c$ and a thickness b. The substrate section 112 has a width a/2, and the substrate section 110, excluding periodic PEC wall 114, also has a width a/2. As noted above, the dielectric wall 118 has a width d. The plated holes 116 of periodic PEC wall 114 have a diameter g resulting in a width of approximately g for periodic PEC wall 114. As shown in FIGS. 2A and 2B, waveguide sections 16, 18 and 20 have respective lengths L1, L2 and L3 and also each have an internal substrate width a/2 and a thickness b. In the illustrated example, V-pol waveguide section 18 includes a 90 degree bend to allow a conductive wire connection to the V-pol waveguide section 18 without physically interfering with H-pol waveguide section 20. In some examples, the substrate sections 110 and 112 and the substrate of waveguide sections 16, 18, 20 are made of Rogers RT/Duroid™ 6002, with a $\varepsilon_r$ of 2.94, and the dielectric wall 118 is an air gap, with an $E_{eff}=\varepsilon_0=1$.

During design of the OMT, the materials, configuration and dimensions noted above (collectively the OMT parameters) of the components of OMT 14 are selected to enable PSC 100 to: (a) decompose dual or X-pol mmW signals received from an unguided medium into separate V-polarized and H-polarized mmW signals; and (b) combine separate V-polarized and H-polarized mmW signals into X-pol mmW signals for transmission into the unguided medium.

For coupling to occur for H-polarized signals, two horizontal modes with different phase velocities are needed. One of those modes must be with even symmetry ($TE_{01}$) and the other one must be with odd symmetry ($TE_{11}$). Coupling across the coupling interface 115 occurs as a result of differences between phase velocities of the even and odd modes.

Referring to FIG. 3A, an example of the operation of the PSC 100 of OMT 14 will be described. In the present example, dual polarized mmW signal 11 is received at PSC port 182 from X-pol waveguide section 16. The dual polarized mmW signal 11 incorporates both a V-polarized mmW signal 11-V ($TE_{10}$ mode in the present example, where TE denotes transverse electric) and an H-polarized signal 11-H ($TE_{01}$ mode in the present example). The V-polarized signal 11-V and H-polarized signal 11-H have the same frequency. In the substrate section 110 of hybrid NRD-SIW first waveguide 90, the vertical $TE_{10}$ mode becomes $TE_{10}^{SIW}$ mode, and the horizontal $TE_{01}$ mode becomes horizontal $LSM_{01}^{SIW}$ mode (where LSM denotes longitudinal sectional magnetic).

The signals of horizontal $LSM_{01}^{SIW}$ mode are able to pass through the periodic PEC wall 114 and the dielectric wall 118 of coupling interface 115 into the substrate section 112 of NRD second waveguide 92. In second waveguide 92, horizontal $LSM_{01}^{SIW}$ mode becomes horizontal $LSM_{01}$ mode (the electric field y-component of the $LSM_{01}$ mode does not cross the periodic PEC wall 114. In particular, the electric field vector of $LSM_{01}^{SIW}$ mode does not include a y-component, which is blocked by the periodic PEC wall 114. However, the periodic PEC wall 114 forms a barrier that prevents the vertically polarized $TE_{10}^{SIW}$ mode from passing through to the second waveguide 92. By the time the signals in PSC 100 have travelled the coupling length $L_c$, first waveguide 110 contains only (or mostly) vertical signals of $TE_{10}^{SIW}$ mode, which are transmitted through V-pol port 18 and output as $TE_{10}$ mode V-polarized signals 11-V. Conversely, second waveguide 112 contains only (or mostly) horizontal signals of $LSM_{01}$ mode, which convert to horizontal $TE_{01}$ mode and are transmitted through H-pol port 20 and output as $TE_{01}$ mode H-polarized signals 11-H.

In a transmitting mode, the PSC 100 operates in the reverse direction. $TE_{01}$ mode H-polarized signals 11-H are input into second waveguide 92 through H-pol port 20 and at the same time $TE_{10}$ mode V-polarized signals 11-V of the same frequency are input into first waveguide 90 through V-pol port 18. Within the PSC 100, horizontal $TE_{01}$ mode converts to horizontal $LSM_{01}$, and passes through the coupling interface 115 from second waveguide 92 to first waveguide 90 to become horizontal $LSM_{01}^{SIW}$ mode. Meanwhile, $TE_{10}$ mode in the first waveguide 90 becomes vertical $TE_{10}^{SIW}$ mode and is prevented by perfect PEC wall 114 from passing into second waveguide 92. In the first waveguide 90, the vertical $TE_{10}^{SIW}$ mode and horizontal $LSM_{01}^{SIW}$ mode combine, resulting in cross polarized signal 11 at X-pol port 16 that contains both vertical $TE_{10}$ mode and horizontal $TE_{01}$ mode signals.

The OMT parameters noted above are selected during design of the OMT 14 to support desired modes of polarized waves in the same frequency range. The width d of the dielectric wall 118 and the width g of the PEC wall 114 are small compared to the dimensions a/2, b and $L_c$. Generally, as the width d of dielectric wall decreases, the length $L_c$ of coupling interface 115 can be shortened. Therefore, in example embodiments the width d is based on the lowest value feasible in a manufacturing process. For example, in a laser cutting process, the smallest width may be 5 microns, such that width d is set at 0.05 mm. Regarding periodic PEC wall 114, the hole diameter g and the periodic spacing of plated holes 116 are selected to ensure the propagation of the $TE_{10}$ mode within first waveguide 90, and reduce the leakage of the $TE_{10}$ mode. In an example case, at 32 GHz operating frequency, the PEC wall 114 includes 51 plated holes 116 over a coupling length $L_c$ of 22.5 mm, with a diameter of 0.2 mm for each plated holes 116, and a periodic spacing of 0.4 mm between plated hole centers.

In some examples, the width a/2 and thickness b of substrate sections 110, 112 in the first and second waveguides 90, 92 and waveguide sections 16, 18, 20 are selected such that the PSC 100 supports both $TE_{10}^{SIW}$ and $LSM_{01}$ modes in the same frequency range, using the following equations.

The cut-off frequencies of the propagating $TE_{10}^{SIW}$ and $LSM_{01}$ are $$f_{c_{TE_{m0}^{SIW}}} = \frac{c}{2\sqrt{\varepsilon_r}} \frac{m}{\left(\frac{a}{2}\right)}, \quad (1)$$

$$f_{c_{LSM_{m1}}} \lesssim \frac{c}{2\sqrt{\varepsilon_r}} \sqrt{\left(\frac{m+1}{2\left(\frac{a}{2}\right)}\right)^2 + \left(\frac{1}{b}\right)^2} \quad (2)$$

In the case of $TE_{10}^{SIW}$, m=1 in (1) and in the case of $LSM_{01}$, m=0.

From the cut off frequencies, the range of the dimensions a/2 and b can be selected such that the operating frequency satisfies the following inequality $$f_{c_{LSM_{01}}} < f_{op} < f_{c_{LSM_{21}}}. \quad (3)$$

In the example of a central operating frequency of 32 GHz and a dielectric constant of 10.2 for substrate sections 110, 112, the dimensions a/2 and b that guarantees the satisfaction of (3) are 2 mm and 1.9 mm, respectively.

Using the above parameters, full coupling is achieved at the full coupling length $L_c$. In other words, the coupling level of the horizontal LSM mode signals at the full coupling length is about 0 dB. In the case of a cross-polarized signal received through waveguide section 16, full coupling leads to the complete separation of two orthogonal polarizations. After travelling the full coupling length $L_c$, the power level of V-polarized signals in the first waveguide 90 and H-polarized signals in the second waveguide 92 is maximized, and the power level of H-polarized signals in the first waveguide 90 and V-polarized signals in the second waveguide 92 is minimized.

Figure 3B:
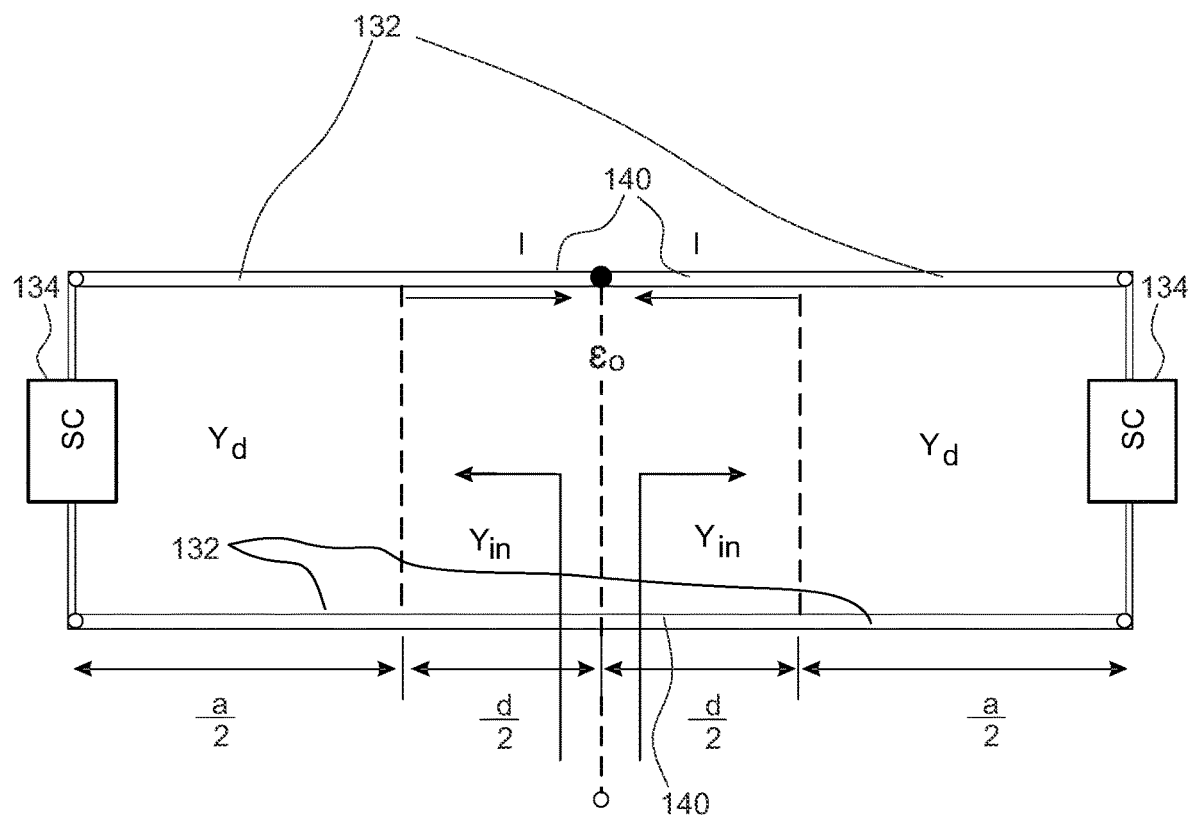
FIG. 3B is circuit model of the PSC of FIG. 3A, according to example embodiments.

An equivalent circuit model 130 of PSC 100 is shown in FIG. 3B to illustrate an example of how to derive the full coupling length $L_c$. The equivalent circuit model 130 consists of two transmission lines 132, 140 connected together and terminated with a short circuit (SC) load 134. Each SC load 134 represents a respective vertical conductive wall layer 106, 108. The transmission line 140 represents the air gap (dielectric wall 118), and has a characteristic admittance $Y_{\text{eff}}$ and a transmission line length that corresponds to the dielectric wall width d. The transmission line 132 represents the two substrate sections 110, 112 that collectively have a characteristic admittance $Y_d$ and a width a. The input admittance of this equivalent circuit can be written as:

$$Y_{in} = Y_{\text{eff}} \frac{Y_{\text{eff}} + Y_d \cot(ua/2)\coth(vd/2)}{Y_{\text{eff}} \coth(vd/2) + Y_d \cot(ua/2)} \quad (4)$$

where $$Y_d = j\omega\varepsilon_o\varepsilon_r/u, \ Y_{\text{eff}} = j\omega\varepsilon_o/v \quad (5)$$

$$\left.\begin{array}{l} u^2 + \beta^2 + \left(\frac{n\pi}{b}\right)^2 = k^2 = \omega^2\mu_o\varepsilon_r \\ -v^2 + \beta^2 + \left(\frac{n\pi}{b}\right)^2 = k_0^2 = \omega^2\mu_o\varepsilon_0 \end{array}\right\} \quad (6)$$

Where $\varepsilon_o$, $\mu_o$ are the permittivity and permeability of free space respectively, $\beta$ is the propagation constant in the z-direction parallel the linear paths 94 and 96, u is the propagation constant in the x-direction within the substrates 110 and 112, v is the propagation constant in the x-direction within the dielectric wall 118 and $\omega$ is the radial frequency of the wave in rad/sec.

Substituting (5) in (4) yields the dispersion relation for the $LSM_{mn}$ modes of the PSC 100. The dispersion relation can be formulated as:

$$u\varepsilon_o \sin(ua/2) + v\varepsilon_r \cos(ua/2) \pm (u\varepsilon_o \sin(ua/2) - v\varepsilon_r \cos(ua/2))e^{-vd} = 0 \quad (7)$$

The negative and positive signs give the solution for the even and odd modes, which are achieved at $Y_{in}=0$ and $Y_{in}\to\infty$, respectively.

From the dispersion relation in (7), the even and odd components of the propagation constant of $LSM_{01}$, $\beta_e$ and $\beta_o$, can be calculated by substituting the solution of (7) in (6). The values of $\beta_e$ and $\beta_o$ of the $LSM_{01}$ mode are used to obtain the required length for achieving full coupling $L_c$ by applying the following equation:

$$L_c = \frac{\pi}{\beta_e - \beta_o} \quad (8)$$

In an example, at the full coupling length $L_c$, the first waveguide 90 has about 0% power level of $LSM_{01}$ mode, and the second waveguide 92 has 100% power of $LSM_{01}$ mode. For example, $L_c$=40 mm at central operating frequency of 38 GHz.

In summary, in one example embodiment, the dielectric wall 118 is air, with $\varepsilon_o$=1, and its width d corresponds to a beam width of the laser used to cut the substrate into substrate sections 110 and 112, namely d=0.05 mm. The substrate sections 110, 112 are each formed from Rogers RT/Duroid 6010 with $\varepsilon_r$=10.2, dielectric loss of 0.0023, and each have a thickness b=1.9 mm. The substrate section 110 has a width of a/2=2 mm. The substrate section 112 has a width of a/2=2 mm, excluding periodic PEC wall 114 which has a width g=0.2 mm. Plated holes 116 of the periodic PEC wall 114 have a periodic spacing of 0.4 mm, and the coupling length $L_c$ of the coupling interface 115 is 22.5 mm.

Figure 3C:
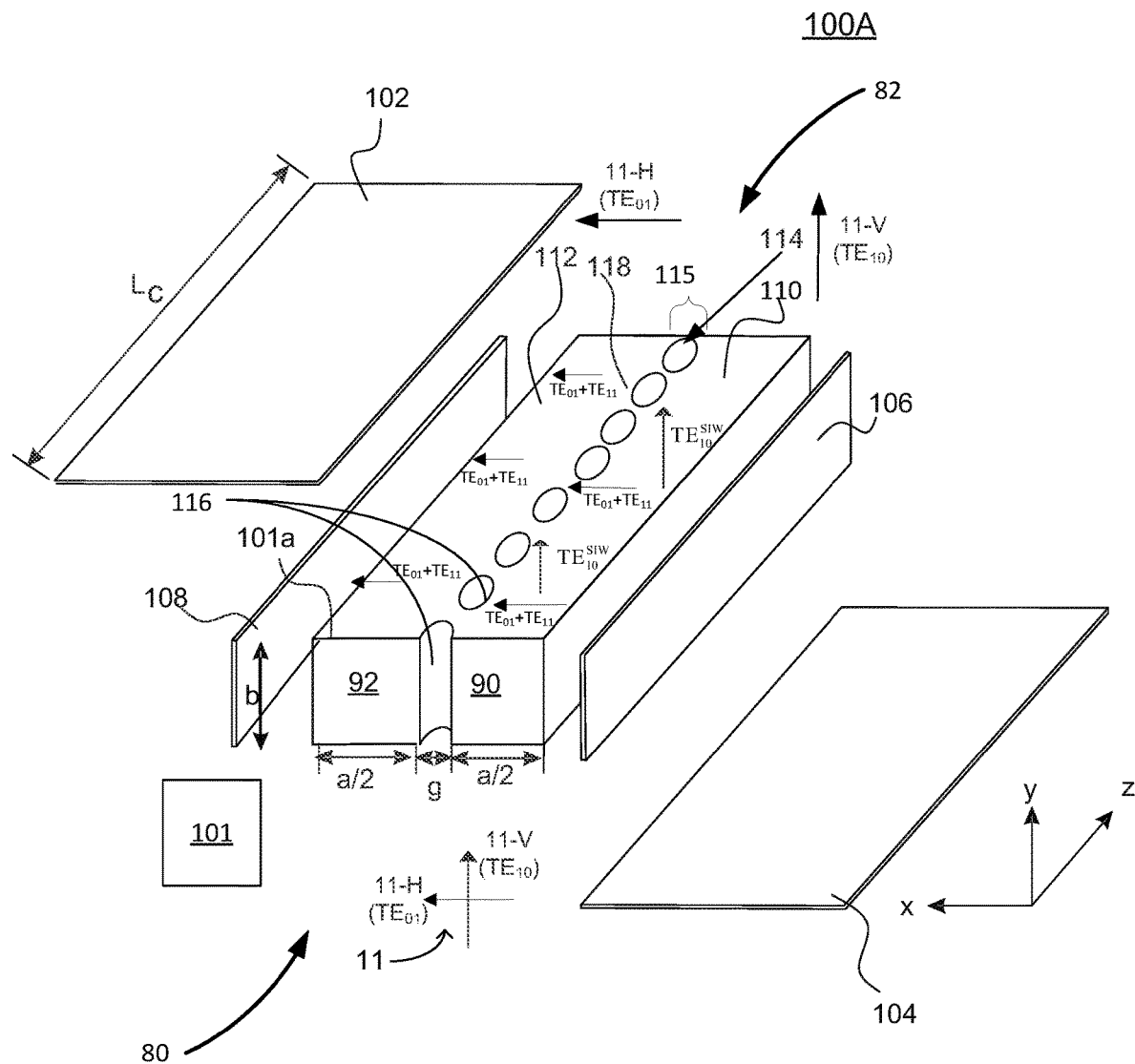
FIG. 3C is an exploded view of a Polarization Selective Coupler (PSC) that can be used in the OMT of FIG. 2A, according to an alternative example embodiment.

Referring to FIG. 3C, a further example embodiment of a PSC 100A is shown. PSC 100A is the same as PSC 100, except that dielectric wall 118 is omitted such that first substrate section 110 and second substrate section 112 are physically joined to each other along periodic PEC wall 114. In this example, the width of the combined substrate sections 110, 112 is w=a/2+g+a/2. The combined substrate sections 110, 112 may have different permittivity in the cross sectional and the longitudinal directions $\varepsilon_{XY}$ and $\varepsilon_Z$, respectively. In the case of this first alternative example embodiment, $$a/2 = 1.2 \frac{c}{2\sqrt{\varepsilon_Z} f_{op}}, \ b = 1.2 \frac{c}{2\sqrt{\varepsilon_{XY}} f_{op}} \quad (9)$$

$$L_c = \frac{\pi}{\beta_y(TE_{01}) - \beta_y(\text{Extraordinary } Mode_{11})} \quad (10)$$

where:

$\beta_e = \beta_y(TE_{01}) \ \& \beta_0 = \beta_y(\text{Extraordinary Mode } 11)$ Accordingly, in the first embodiment described above in respect of PSC 100, both an air gap dielectric wall 118 and PEC wall 114 provide the polarization selective coupling interface 115 between the first and second waveguides 90, 92, and in the further embodiment described above in respect of PSC 100A, only PEC wall 114 provides the polarization selective coupling interface 115 between the first and second waveguides 90, 92. Both of PSC 100 and PSC 100A employ a structure in which two dielectric slab waveguides (first and second waveguides 90 and 92) are parallel to each other and separated by a thin periodic PEC wall 114 of conductive elements 116. Only signal modes that have an electric field vector normal to the conductive elements 116 are able to couple from one waveguide to the other waveguide. Other modes with electric fields that are tangential to the PEC wall 114 will not couple between the parallel waveguides across the periodic PEC wall 114.

Both PSC 100 and PSC 100A incorporate dielectric slabs in the form of substrate sections 110, 112. In yet a further example embodiment of PSC 100A, a simpler structure is employed by using two hollow air-filled rectangular waveguides to implement first and second waveguides 90, 92. In this second alternative example embodiment, the PSC 100A is implemented as two adjacent hollow waveguide structures that have a common wall formed by a row of conductive elements 116. In this case, the input admittance obtained in (4) reduces to the following expression:

$$Y_{in} = \lim_{d\to 0}\left\{Y_{\text{eff}} \frac{Y_{\text{eff}} + Y_d \cot(ua/2)\coth(vd/2)}{Y_{\text{eff}} \coth(vd/2) + Y_d \cot(ua/2)}\right\} = Y_d \cot(ua/2) \quad (11)$$

In this case, the even and odd modes necessary for coupling are the $TE_{01}$ and $TE_{11}$ modes, respectively. As well, the even and odd components of the propagation constant $\beta_e$ and $\beta_o$ can be shown in the following equations:

$$\beta_e(TE_{01}) = \sqrt{k_o^2 - \left(\frac{\pi}{b}\right)^2} \quad (12)$$

$$\beta_o(TE_{11}) = \sqrt{k_o^2 - \left(\frac{\pi}{b}\right)^2 - \left(\frac{\pi}{a+g}\right)^2} \quad (13)$$

Where $k_o$ is the free space wavenumber. the full coupling length is $$L_c = \frac{\pi}{\sqrt{k_o^2 - \left(\frac{\pi}{b}\right)^2} - \sqrt{k_o^2 - \left(\frac{\pi}{b}\right)^2 - \left(\frac{\pi}{a+g}\right)^2}} \quad (14)$$

and the H-polarized modes propagating through the waveguides 90 and 92 are the necessary modes for achieving coupling, for example $TE_{01}$ mode and $TE_{11}$ mode. The V-polarized $TE_{10}$ mode propagates only through waveguide 90.

The appearance of $TE_{21}$ mode will impede full coupling, and accordingly the waveguide dimensions are selected during design to support signals from the cutoff frequency of $TE_{11}$ mode to the cutoff frequency of $TE_{21}$ mode. Thus, the bandwidth supported by the waveguide structure is between the $TE_{11}$ mode and the $TE_{21}$ mode, as in the following relation $$BW = \frac{c}{2}\left(\sqrt{\left(\frac{2}{a+g}\right)^2 + \left(\frac{1}{b}\right)^2} - \sqrt{\left(\frac{1}{a+g}\right)^2 + \left(\frac{1}{b}\right)^2}\right) \quad (15)$$

In an example, $a/2=b=6$ mm, $L_c=27$ mm, $g=0.5$ mm and $f_{op}=30$ GHz. The resulting BW based on (15) is 6 GHz.

In the embodiments described above, the OMT 14 forms a planar structure, meaning that it has a uniform thickness over its entire width and length. In the illustrated embodiment, the uniform thickness is approximately b plus the thickness of metallic top and bottom layers 102, 104. In the embodiments that use a dielectric substrate (for example as shown in FIGS. 3A and 3C), the OMT 14 can be integrated into a planar PCB structure. Accordingly, OMT 14 provides a dual polarized device that can be implemented in a low profile, space saving configuration suitable for use within the confined housing of a mobile device such as a user equipment (UE).

Dual Polarized Beamforming Network

Figure 4:
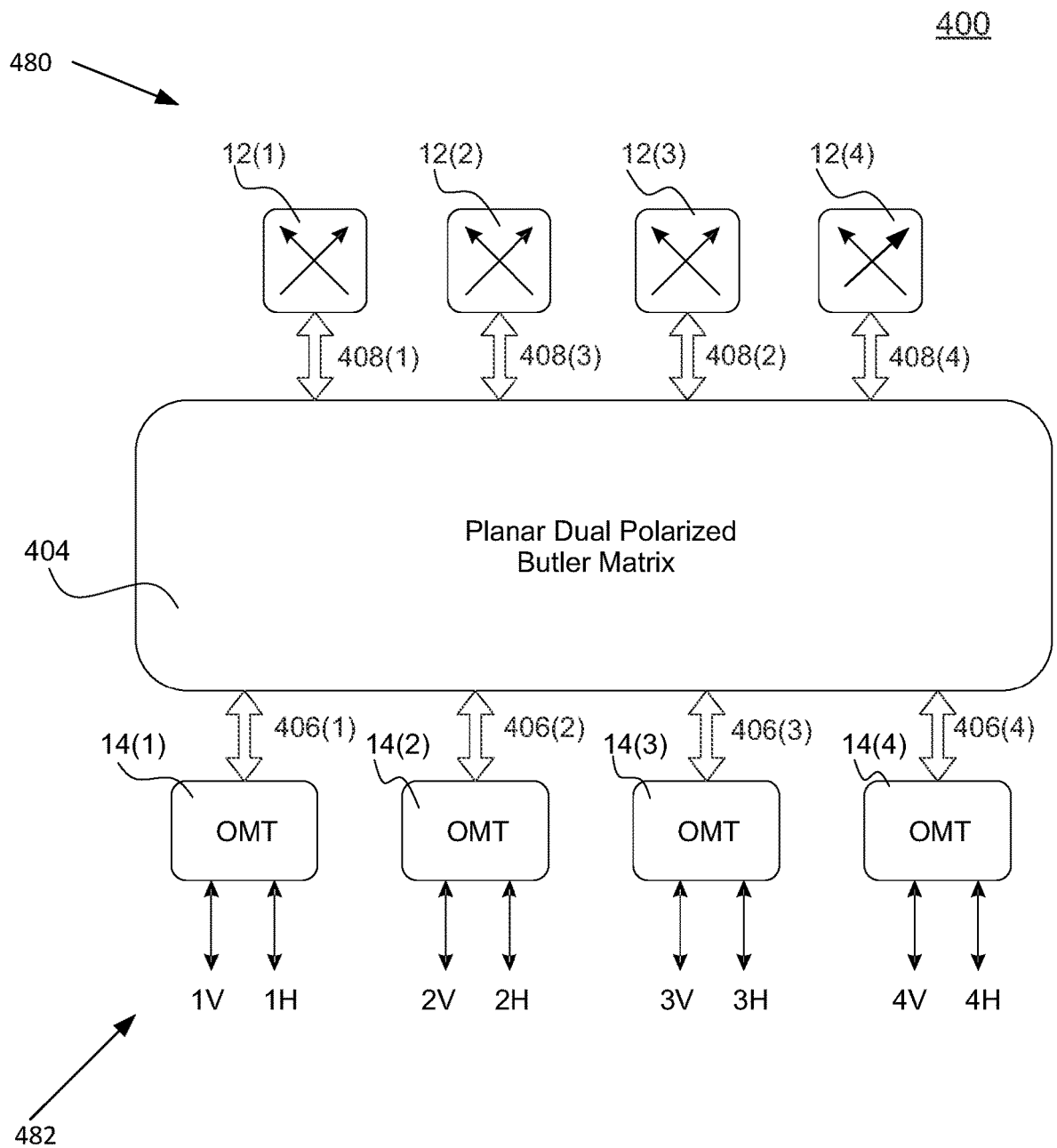
FIG. 4 is a block diagram of a dual polarized beamforming system, according to example embodiments.

The polarization selective waveguide configurations disclosed above in respect of OMT 14 and PSCs 100, 100A can be applied in various applications. In this regard, FIG. 4 illustrates a block diagram of a dual polarized beamforming system 400, which could be used at a base station for example. The dual polarized beamforming system 400 is a passive system configured to simultaneously handle horizontally and vertically polarized mmW signals for generating and receiving diverse beam pattern configurations. At the core of the dual polarized beamforming system 400 is a Butler matrix 404. Butler matrix structures, which are previously known in the context of single polarization signals that are vertically oriented, provide a progressive phase shift at the matrix output ports that is based on the matrix geometry. The present disclosure describes a planar Butler matrix 404 that is able to handle both vertically and horizontally oriented polarizations simultaneously and independently to produce a desired beamforming result. Using both polarizations can improve system efficiency by requiring less power than single polarization based processing.

In the dual polarized beamforming system 400 of FIG. 4, Butler matrix 404 is a dual polarized 4×4 matrix. Four X-Pol antennas 12(1)-12(4) are connected to four respective ports 408(1)-408(4) on an antenna-side 480 of the Butler matrix 404 for interfacing with an unguided wireless medium. Four OMTs 14(1)-14(4) are connected to four respective ports 406(1)-406(4) on a TRX circuitry-side 480 for interfacing with TRX circuitry through guided electrical conductors.

During a receiving operation, polarized mmW signals from each of four polarized antennas 12(1)-(4) are received at the four respective ports 408(1)-408(4) of the dual polarized Butler matrix 404. Each of the four polarized mmW signals may have different phases and power. The dual polarized Butler matrix 404 adjusts the phases and power of the received dual-polarized wave signals at the four ports 406(1)-406(4) at the other end of the dual polarized Butler matrix 404 to get the design values needed for beamforming. The four phase and power adjusted waves are then received by four OMTs 14(1)-14(4). Each of the OMTs 14(1)-14(4) decompose a polarized wave into a vertical polarization and a horizontal polarization of the same frequency range.

During a transmitting operation, each of OMTs 14(1)-14(4) receives V-polarized and H-polarized mmW signals within the same frequency range, for example from a transceiver circuitry 15. Each OMT 14(1)-14(4) combines V-polarized and H-polarized mmW signals into a dual polarized mmW signal. The dual-polarized mmW signals are received at the respective ports 406(1)-406(4). The dual-polarized Butler matrix 404 shifts the phase of each of the four received dual polarized mmW signals to desired phase and power levels at the respective four ports 408(1)-408(4) of the dual polarized Butler matrix 404. The phase shifted dual polarized mmW signals are fed to respective X-Pol antennas 12(1)-12(4) for radiating in a desired beam formed pattern. Beam steering can be deliberately controlled by feeding only one of the ports 406(1)-406(4) at a given time that corresponds to the required beam direction.

Figure 5:
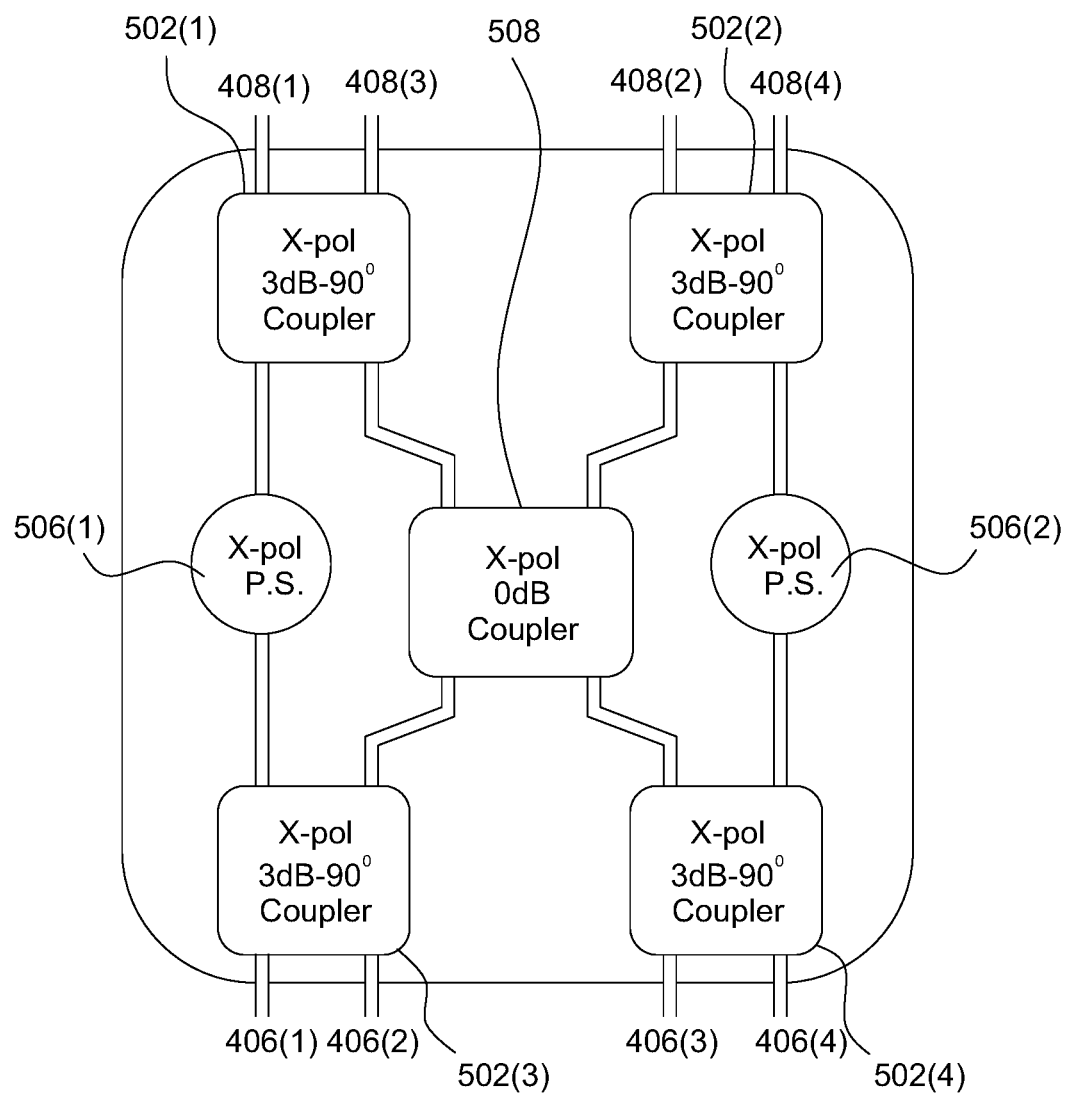
FIG. 5 is a block diagram of a dual polarized Butler matrix, according to example embodiments.

FIG. 5 is a block diagram showing details of the dual polarized Butler matrix 404 of dual polarized beamforming system 400. The dual polarized Butler matrix 404, as illustrated, includes dual polarized 3 dB couplers 502(1)-502(4) (generally 3 dB couplers 502), dual polarized 0 dB coupler 508, and dual polarized phase shifters 506(1) and 506(2) (generally phase shifters 506). Each of these components is configured to handle dual polarizations simultaneously. In some examples, the components of dual polarized Butler matrix 404 are metal walled structures filled with a dielectric substrate that functions as the waveguide medium, and in other examples they are hollow metal walled components in which air functions as the waveguide medium. In some examples, additional components such as additional dual polarized 0 db couplers 508 and dual polarized phase shifters 506 to implement a further dual phase crossover could be included between the matrix shown in FIG. 5 and at least some of the antennas connected to ports 408.

Figure 6A:
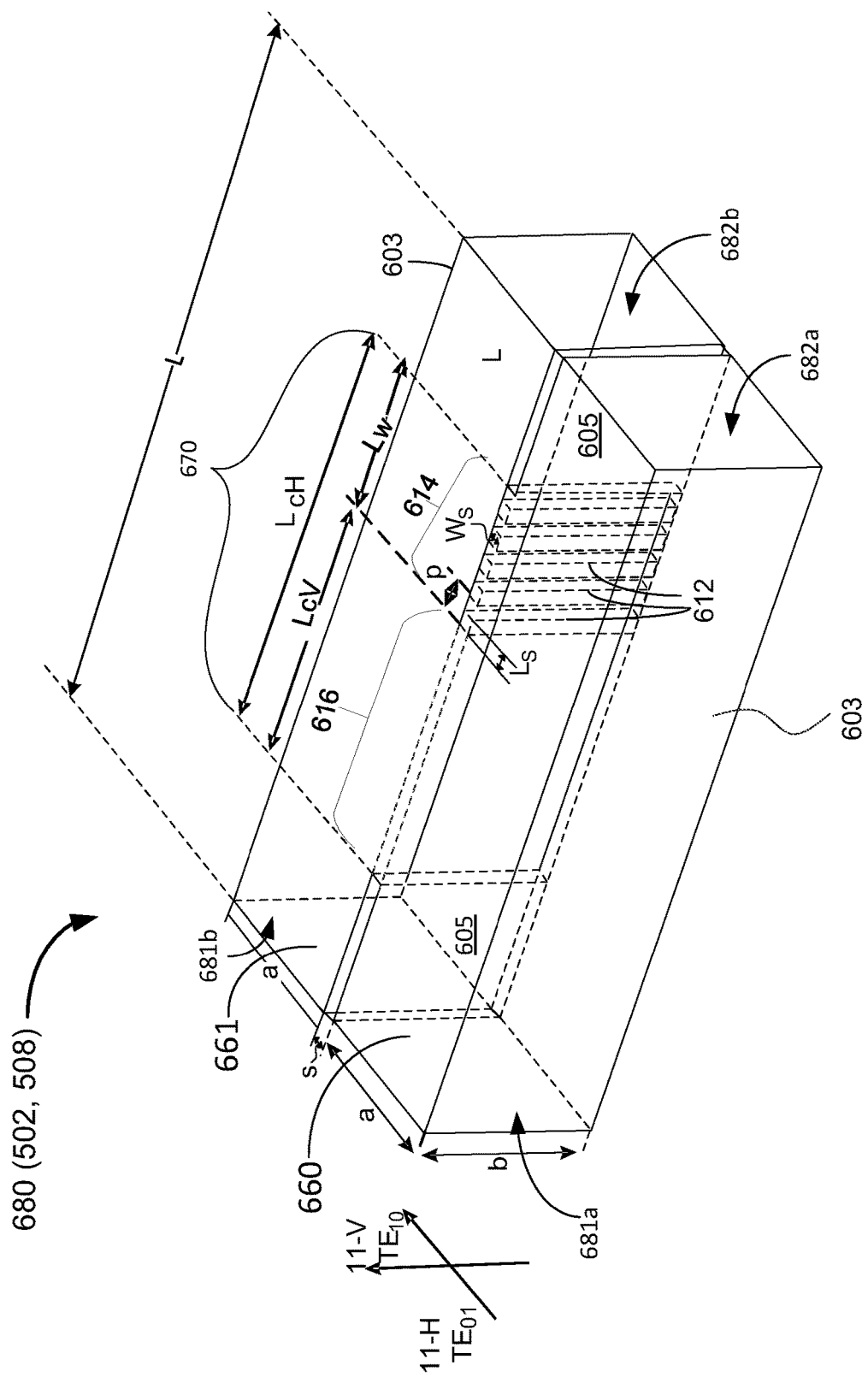
FIG. 6A is a perspective view of a dual polarized coupler, according to example embodiments.

FIG. 6A illustrates a dual polarized coupler structure 680 that can be used to implement both 3 dB coupler 502 and 0 dB coupler 508 in Butler matrix 404. In one example, the dual polarized coupler structure 680 is formed from a rectangular outer metallic wall 603 that is partially divided by an intermediate wall 605 into two identical, parallel, rectangular first and second waveguides 660, 661 of length L. The intermediate wall 605, which has a width s, does not extend the entire length L, but rather is absent for a central length $L_{cH}$ providing a coupling interface section 670 between the first and second waveguides 660, 661. As will be explained below, coupling interface section 670 is a modified Riblet or short slot coupler configured to couple two independent orthogonal modes simultaneously and provide the same coupling level for both horizontal and vertical polarizations.

As shown in FIG. 6A, first and second waveguides 660, 661 each have a width a and a thickness b. It will be noted that the value a as used hereinafter corresponds to the value of a/2 as used previously in this description. Coupling interface section 670 includes a first interface sub-section 616 of length $L_{cV}$ in which there is no conductive barrier between the first and second waveguides 660, 661. The rest of the length of the coupling interface section 670 includes a periodic PEC wall 614 of length $L_w$ that includes evenly spaced conductive elements 612 that are electrically connected at opposite ends to top and bottom metal walls 605 of the dual polarized coupler structure 680. In some examples, conductive elements 612 may be metal pins (for example in a hollow waveguide structure) or they may be conductively plated holed or vias (for example in a dielectric substrate filled waveguide structure).

The periodic PEC wall 614 is configured to allow H-polarized signals to pass through but to block V-polarized signals whose electric field is tangential to the periodic metallic vertical pins. Accordingly, the distance between two adjacent conductive elements 612 is smaller than the minimum operating wavelength of the waveguides. The periodic PEC wall 614 has a periodic spacing of p.

The S-parameters of dual polarized coupler structure 680 can be written as follows:

$$S_{42} = S_{31} = \exp\left(-j\frac{(\beta_e + \beta_0)l}{2}\right)\cos\left(\frac{(\beta_e - \beta_0)l}{2}\right) \quad (16)$$

$$S_{32} = S_{41} = -j\exp\left(-j\frac{(\beta_e + \beta_0)l}{2}\right)\sin\left(\frac{(\beta_e - \beta_0)l}{2}\right) \quad (17)$$

$$S_{21} = S_{43} = 0 \quad (18)$$

where the even and odd components of the propagation constant of the excited mode, $\beta_e$ and $\beta_o$, are different for each excited mode.

Each of the first and second waveguides 660 and 661 has a cross sectional area of a X b, a respective first port 681a and 681b, and a respective second port 682a, 682b. In an example, a≈b. The region of first and second waveguides 660, 661 at coupling interface section 670 (length $L_{ch}$) may be considered as a rectangular waveguide of cross sectional area (2a+s)×b. The dispersion curve of different modes in coupling interface section 670 is:

$$\beta_{mn} = \frac{\omega}{c}\sqrt{1 - \left(\frac{f_{c_{mn}}}{f}\right)^2} \quad (18)$$

where $$f_{c_{mn}} = \frac{c}{2}\sqrt{\left(\frac{m\pi}{2a+s}\right)^2 + \left(\frac{n\pi}{b}\right)^2}. \quad (19)$$

Exciting first or second waveguide 660, 661 with vertically oriented $TE_{10}$ mode signals 11-V results in even and odd modes $TE_{10}^{2a+s}$ and $TE_{20}^{2a+s}$ at the region of coupling interface 670 (superscript 2a+s is used to refer to the modes at coupling interface 670. Exciting first or second waveguide 660, 661 with horizontally oriented $TE_{01}$ mode signals results in even and odd modes $TE_{01}^{2a+s}$ and $TE_{11}^{2a+s}$ at the coupling interface 670.

Accordingly, the length of the coupling section 670 determines the coupling level between first and second waveguides 660, 661. The first open interface sub-section 616 of coupling interface section 670 allows both H-polarized and V-polarized mmW signals to couple between the first and second waveguides 660, 661. The periodic PEC wall 614 sub-section of the coupling interface section 670 allows only H-polarized mmW signals to couple between the first and second waveguides 660, 661, and blocks V-polarized mmW signals. Thus, as shown in FIG. 6a, the entire length $L_{cH}$ of coupling interface section 670 corresponds to the distance available for coupling H-polarized signals and the shorter length $L_{cV}$ of the open interface sub-section 616 corresponds to the distance available for coupling V-polarized signals. In some examples, instead of being a single planar structure of width s, intermediate common wall 605 could take the form of a pair of spaced apart parallel metallic layers separated by a distance of s less the thickness of the metal layers.

In example embodiments, one set of values for the lengths $L_{cH}$ and $L_{cV}$ of the dual polarized coupler structure 680 is used to implement each of the dual polarized 3 dB-90° couplers 502, and a different set of values for the lengths $L_{cH}$ and $L_{cV}$ is used to implement dual polarized 0 dB coupler 508.

As indicated by the 3 dB notation, dual polarized 3 dB-90° coupler 502 is configured to equally split power between the first and second waveguides 660, 661 for both H-polarized and V-polarized signals, and is effectively a 2×2 dual polarized Butler matrix. For example, vertically oriented $TE_{10}$ mode signals 11-V having a power level Xv entering the first waveguide 660 at a first end of 3 dB-90° coupler 502 will be split into first and second vertically oriented $TE_{10}$ mode signals 11-V each having a power level Xv/2 and exiting first and second waveguides 660, 661 respectively at the second end of 3 dB-90° coupler 502. Similarly, horizontally oriented $TE_{01}$ mode signals 11-H having a power level Xh entering the first waveguide 660 at a first end of 3 dB-90° coupler 502 will be split into first and second horizontally oriented $TE_{01}$ mode signals 11-H each having a power level Xh/2 and exiting first and second waveguides 660, 661 respectively at the second end of 3 dB-90° coupler 502.

The coupling length $L_c^{3\ dB}$ for dual polarized 3 dB-90° coupler 502 follows directly from (17), where:

$$\text{at } l = L_c^{3dB}: S_{21} = S_{31} = \sqrt{0.5} \Rightarrow L_c^{3dB} = \frac{\pi}{2(\beta_e - \beta_0)} \quad (20)$$

$$\text{and at } l = L_c^{3dB}: \frac{S_{31}}{S_{21}} = -j \quad (21)$$

However, because the vertically oriented even and odd modes are different from the horizontal polarization, the coupling lengths for both cases are different:

$$L_{cV}^{3dB} = \frac{\pi}{2(\beta_{10} - \beta_{20})} \neq L_{cH}^{3dB} = \frac{\pi}{2(\beta_{01} - \beta_{11})} \quad (22)$$

$$\text{where } L_{cV}^{3dB} < L_{cH}^{3dB} \quad (23)$$

$\beta_{10}$, $\beta_{20}$, $\beta_{01}$ and $\beta_{11}$ are the respective propagation constants of $TE_{10}^{2a+s}$, $TE_{20}^{2a+s}$, $TE_{01}^{2a+s}$, $TE_{11}^{2a+s}$.

The coupling length $L_{ch}^{3\ dB}$ between first and second waveguides 660, 661 can be divided into two parts: $L_{cV}^{3\ dB}$ and $L_w = L_{cH}^{3\ dB} - L_{cV}^{3\ dB}$, where $L_w$ is the length of the periodic PEC wall 614.

In an example embodiment, the waveguide dimensions are a=b=6 mm, so that for an operating central frequency of $f_0$=30 GHz, $L_{cV}^{3\ dB}$=9 mm and $L_{cH}^{3\ dB}$=14 mm, and the periodic PEC wall 614 includes five (5) square conductive elements 612 connective of dimensions 0.5×0.5×6 mm and period of 1 mm, covering a length of $L_{cH}^{3\ dB}-L_{cV}^{3dB}$=5 mm.

Dual polarized 0 dB coupler 508 is a cross-over junction in which all of the power of both the horizontally and vertically polarized signals in the excited waveguide (for example first waveguide 660) is transferred to the other waveguide (for example second waveguide 661) through the coupling interface 670. The design of dual polarized 0 dB coupler 508 is the same as the dual polarized 3 dB-90° coupler 504 described above except for the coupling lengths, which can be determined as follows:

$$\text{at } l = L_c^{0dB}: S_{21} = 0 \text{ and } S_{31} = 1 \Rightarrow L_c^{0dB} = \frac{\pi}{\beta_e - \beta_0} \quad (24)$$

Because output is entirely delivered at only one port, the phase response is measured relative to the input port. This phase response is given by:

$$\text{at } l = L_c^{0dB}: \angle S_{31} = -\pi \frac{\beta_e}{\beta_e - \beta_o} \quad (25)$$

Because the even and odd modes of the vertical polarization are different from those of the horizontal polarization, the coupling lengths for both polarizations are different, where $$L_{cV}^{0dB} = \frac{\pi}{\beta_{10} - \beta_{20}} \neq L_{cH}^{0dB} = \frac{\pi}{\beta_{01} - \beta_{11}} \quad (26)$$

$$\text{where } L_{cV}^{0dB} < L_{cH}^{0dB} \quad (27)$$

Thus, the dual polarized coupler 508 with 0 dB coupling level integrates a periodic PEC wall 614 of a length $L_{cH}-L_{cV}$. In an example embodiment, the waveguide dimensions are a=b=6 mm, so that for an operating central frequency of $f_0$=30 GHz, $L_{cV}^{0\ dB}$=18 mm and $L_{cH}^{0\ dB}$=28 mm, and the periodic PEC wall 614 includes ten (10) square conductive elements 612 connective of dimensions 0.5×0.5×6 mm and period of 1 mm, covering a length of $L_{cH}^{0\ dB}-L_{cV}^{0\ dB}$=10 mm.

Figure 6B:
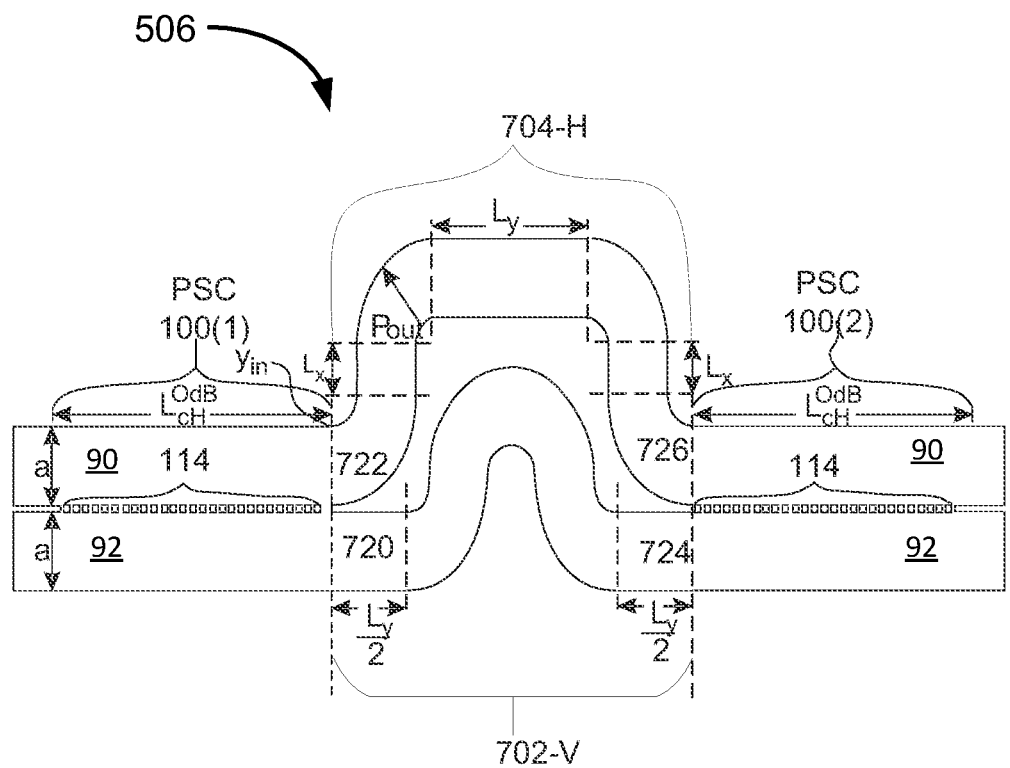
FIG. 6B is a top view of a dual polarized phase shifter, according to example embodiments.

FIG. 6B illustrates an example embodiment of a dual polarized phase shifter 506 according to example embodiments. The dual polarized phase shifter 506 adjusts the phase of the V-polarized and H-polarized mmW signals independently by using a first PSC 100(1) to separate cross polarized signals into separate V-polarized and H-polarized signal paths that include respective zero insertion loss delay line phase shifters 702-V and 704-H, followed by a second PSC 100(2) which then recombines the phase shifted V-polarized and H-polarized signals back into a cross polarized signal. The use of separate delay line phase shifters 702-V and 704-H allows the differing phase responses of V-polarized and H-polarized signals to a curved square waveguide to be accounted for in the design of dual polarized phase shifter 506.

In example embodiments, PSC 100(1) and PSC 100(2) are oriented in reverse directions relative to each other and are configured in the same manner as PSC 100 described above, each having an intermediate periodic PEC wall 114 forming an H-polarization coupling interface between first and second waveguides 90 and 92.

The delay line phase shifters 702 and 704 are configured so that the longer path phase shifter 704 applies a desired phase shift to H-polarized mmW signals and the shorter path phase shifter 702 applies a desired phase shift to the V-polarized mmW signals. In some examples the desired phase shift may be the same for both the H-polarized and V-polarized signals. The phase response of phase shifters 702 and 704 is determined by the length of their respective waveguide paths, and the two phase shifters 702 and 704 have different lengths to achieve the desired phase shift for each polarization. In an example of a square waveguide path of a=b=6 mm, at a 30 GHz central operating frequency, the values of the dimensions as shown in FIG. 6B are: $\rho_{out}$=8.5 mm, $L_y$=15 mm and $L_y$=3.3 mm.

The phase for the path of the vertically polarized mode in phase shifter 702-V is:

$$\Phi_1^V = 4\varphi_{bend} + \varphi_{L_{Total}-L_{eq}} \quad (28)$$

The phase for the path of the horizontally polarized mode in phase shifter 704-H is:

$$\Phi_1^H = 2\varphi_c^H + 4\varphi_{bend} + 2\varphi_{L_x} + \varphi_{L_y} \quad (29)$$

$$\text{where } L_{Total} = L_{eq} + 2L_{cH}^{0\ dB} = 2L_1 + L_{cH}^{0\ dB} \quad (30)$$

$$\text{and } L_{eq} = L_y + 4\rho_{in} + 2a \quad (31)$$

The term $\varphi_L$ represents the phase delay in a square waveguide of length L and is given by $\varphi_L = \beta_{10}L = \beta_{01}L$. The term $\varphi_{bend}$ is the phase shift produced in a circulating waveguide with sectoral angle of 90 degrees.

Figure 7A:
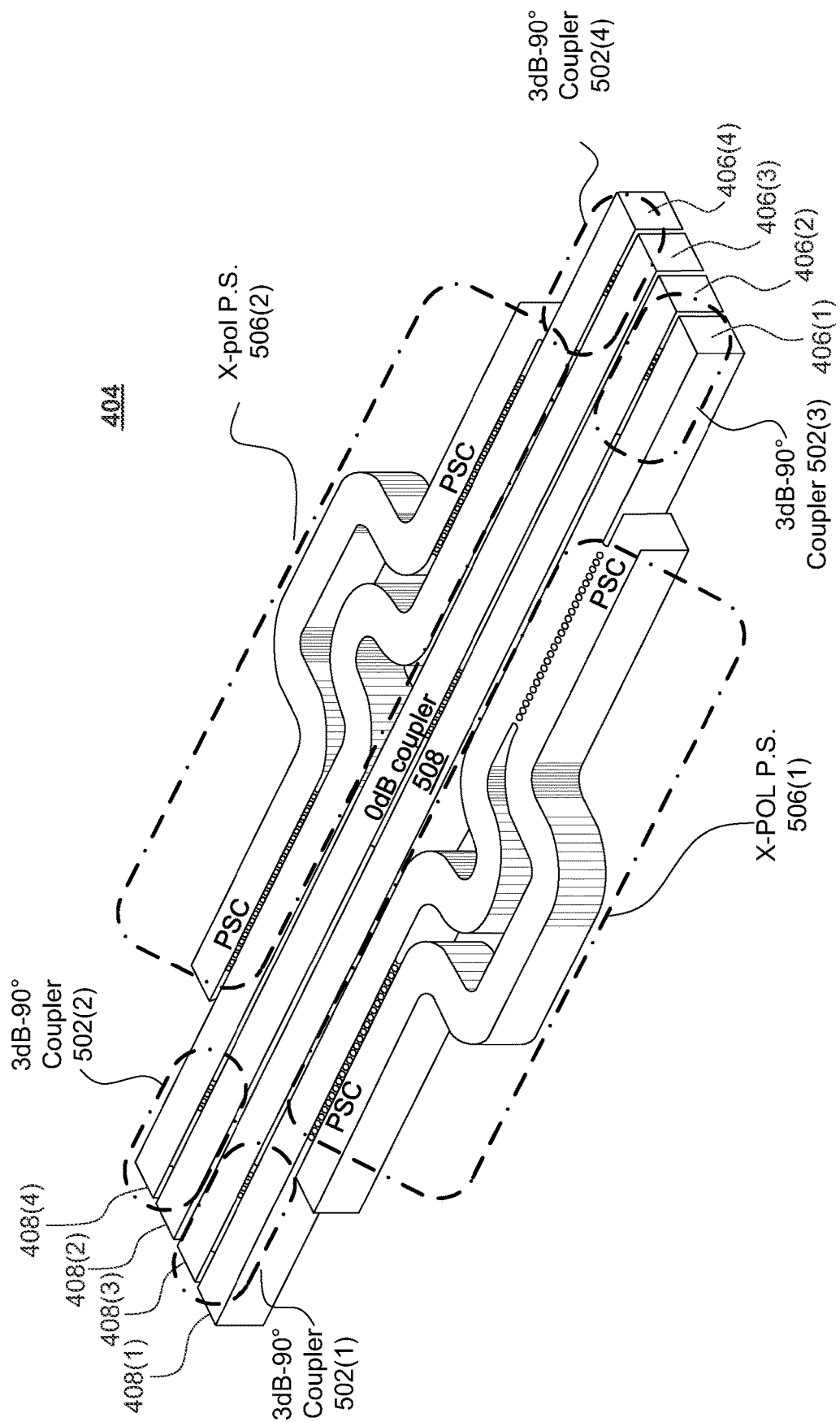
FIG. 7A is a perspective view of a physical embodiment of the dual polarized Butler matrix of FIG. 5, according to example embodiments.

FIG. 7A illustrates a physical embodiment of planar dual polarized Butler matrix 404. When receiving signals, cross polarized mmW signals received at antenna side ports 408(1) to 408(4) feed 3 dB-90° couplers 502(1) and 502(2) that each in turn feed central crossover 0 dB coupler 508. The 3 dB-90° coupler 502(1) and the 3 dB-90° couplers 502(2) each feed a respective X-pol phase shifter 506(1) and 506(2) that runs parallel to central crossover 0 dB coupler 508. Signals output from X-pol phase shifter 506(1) and one port of central crossover 0 dB coupler 508 are fed to 3 dB-90° coupler 502(3) for output at ports 406(1) and 406(2). Signals output from X-pol phase shifter 506(2) and the other port of central crossover 0 dB coupler 508 are fed to 3 dB-90° coupler 502(4) for output at ports 406(3) and 406(4). As illustrated in FIG. 7, the dual polarized Butler matrix 404 is a planar structure, and is convenient to integrate on a PCB. The dual polarized Butler matrix 404 acts in the reverse order as described above when used to transmit signals.

In an example, dimensions of the components a full 4×4 dual polarized Butler matrix at 30 GHz are (mm):

| a, b | $L_{cV}^{3\ db}$ | $L_{cH}^{3\ db}$ | $L_{cV}^{0\ db}$ | $L_{cH}^{0\ db}$ | $\rho_{out}$ | $L_x$ | $L_y$ |
|---|---|---|---|---|---|---|---|
| 6 | 9 | 14 | 18 | 28 | 8.5 | 3.3 | 15 |

At the center operating frequency of 30 GHz, over a bandwidth of 1 GHz around the center operating frequency of 30 GHz, the measured power response is around −6 dB at each of the four ports 406(1)-406(4).

Figure 7B:
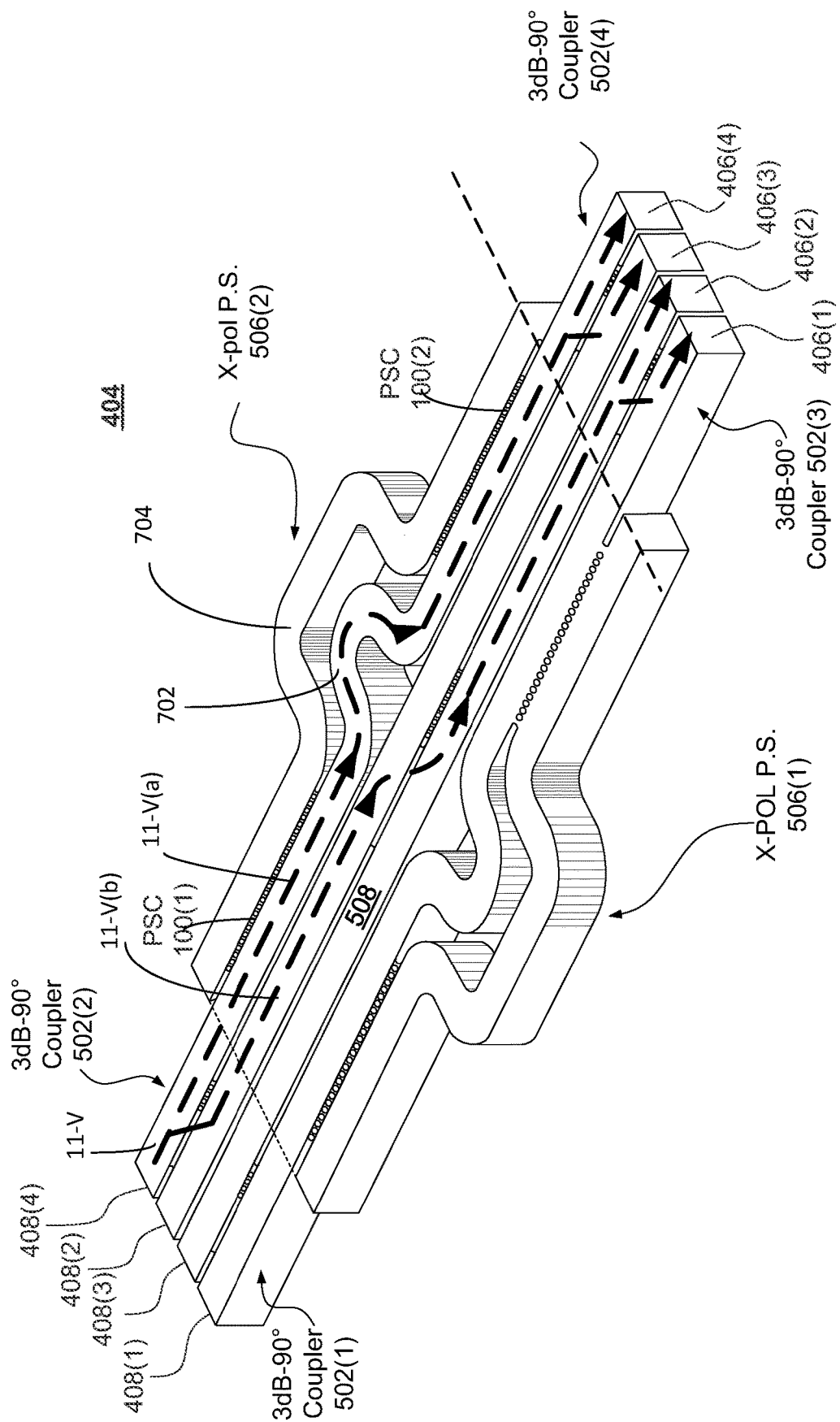
FIG. 7B is a perspective view showing an example of a vertically polarized signal propagating through the dual polarized Butler matrix of FIG. 7A.

To provide further understanding, FIG. 7B provides a graphic illustration of the passive processing of a V-polarized mmW signal 11-V that enters port 408(4) of the Butler matrix 404 as part of a cross-polarized signal. As seen in FIG. 7B, V-polarized mmW signal 11-V is split into two equal power signals 11-V(a) and 11-v(b) at 3 dB-90° coupler 502(2). V-polarized mmW signal 11-V(a) passes straight through the first PSC 100(1) of X-Pol phase shifter 506(2) and continues through delay line phase shifter 702-V and the second PSC 100(2) into 3 dB-90° coupler 502(4), which splits phase-shifted V-polarized mmW signal 11-V(a) into a further two equal power signals that are fed to ports 406(3) and 406(4). It will be noted that in each of PSC 100(1) and PSC 100(2) of X-Pol phase shifter 506(2) the V-polarized mmW signal 11-V(a) is contained within its respective waveguide path by the periodic PEC wall 114 in each of the PSCs.

At the same time that V-polarized mmW signal 11-V(a) is being processed, the other half of the split signal, mmW signal 11-V(b) is redirected at crossover 0 dB coupler 508 to 3 dB-90° coupler 502(4), which splits the signal into a further two equal power signals that are fed to ports 406(1) and 406(4). Accordingly, the original V-polarized mmW signal 11-V received at port 408(4) is equally split into four V-polarized mmW signals, with two of the signals (e.g. at ports 406(1) and 406(2)) maintaining the original phase, and two of the signals (e.g. at ports 406(3) and 406(4)) being phase shifted by the same amount. V-polarized mmW signals fed to ports 408(1) to 408(3) are respectively processed in a similar manner.

Figure 7C:
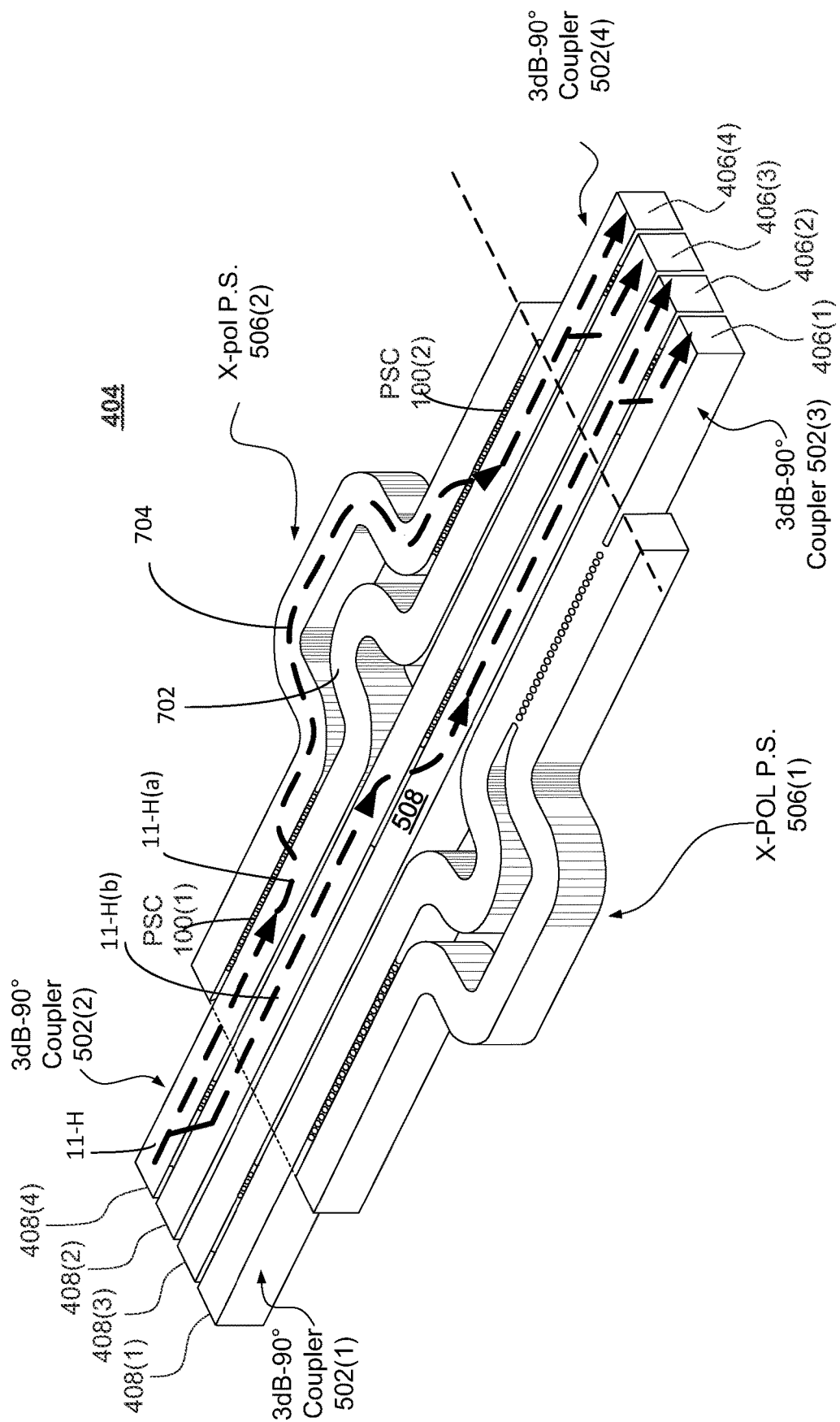
FIG. 7C is a perspective view showing an example of a horizontally polarized signal propagating through the dual polarized Butler matrix of FIG. 7A.

FIG. 7C provides a graphic illustration of the passive processing of H-polarized mmW signal 11-H that enters port 408(4) of the Butler matrix 404 as part of a cross-polarized signal that also includes V-polarized mmW signal 11-V. As seen in FIG. 7C, H-polarized mmW signal 11-H is split into two equal power signals 11-H(a) and 11-H(b) at 3 dB-90° coupler 502(2). H-polarized mmW signal 11-H(a) is diverted at the first PSC 100(1) into the waveguide path of X-Pol phase shifter 506(2) that corresponds to delay line phase shifter 702-H. The phase shifted H-polarized mmW signal 11-H(a) is then diverted again at second PSC 100(2) into 3 dB-90° coupler 502(4), which splits phase-shifted H-polarized mmW signal 11-H(a) into a further two equal power signals that are fed to ports 406(3) and 406(4). It will be noted that in each of PSC 100(1) and PSC 100(2) of X-Pol phase shifter 506(2) the H-polarized mmW signal 11-H(a) couples into the adjacent waveguide path through the periodic PEC wall 114 in each of the PSCs.

At the same time that H-polarized mmW signal 11-H(a) is being processed, the other half of the split signal, mmW signal 11-H(b), is processed in exactly the same manner as described above in respect V-polarized mmW signal 11-V (b). Accordingly, the original H-polarized mmW signal 11-H received at port 408(4) is equally split into four H-polarized mmW signals, with two of the signals (e.g. at ports 406(1) and 406(2)) maintaining the original phase, and two of the signals (e.g. at ports 406(3) and 406(4)) being phase shifted by the same amount. H-polarized mmW signals fed to ports 408(1) to 408(3) are respectively processed in a similar manner.

Dual Polarized Six-Port Junction

Figure 8A:
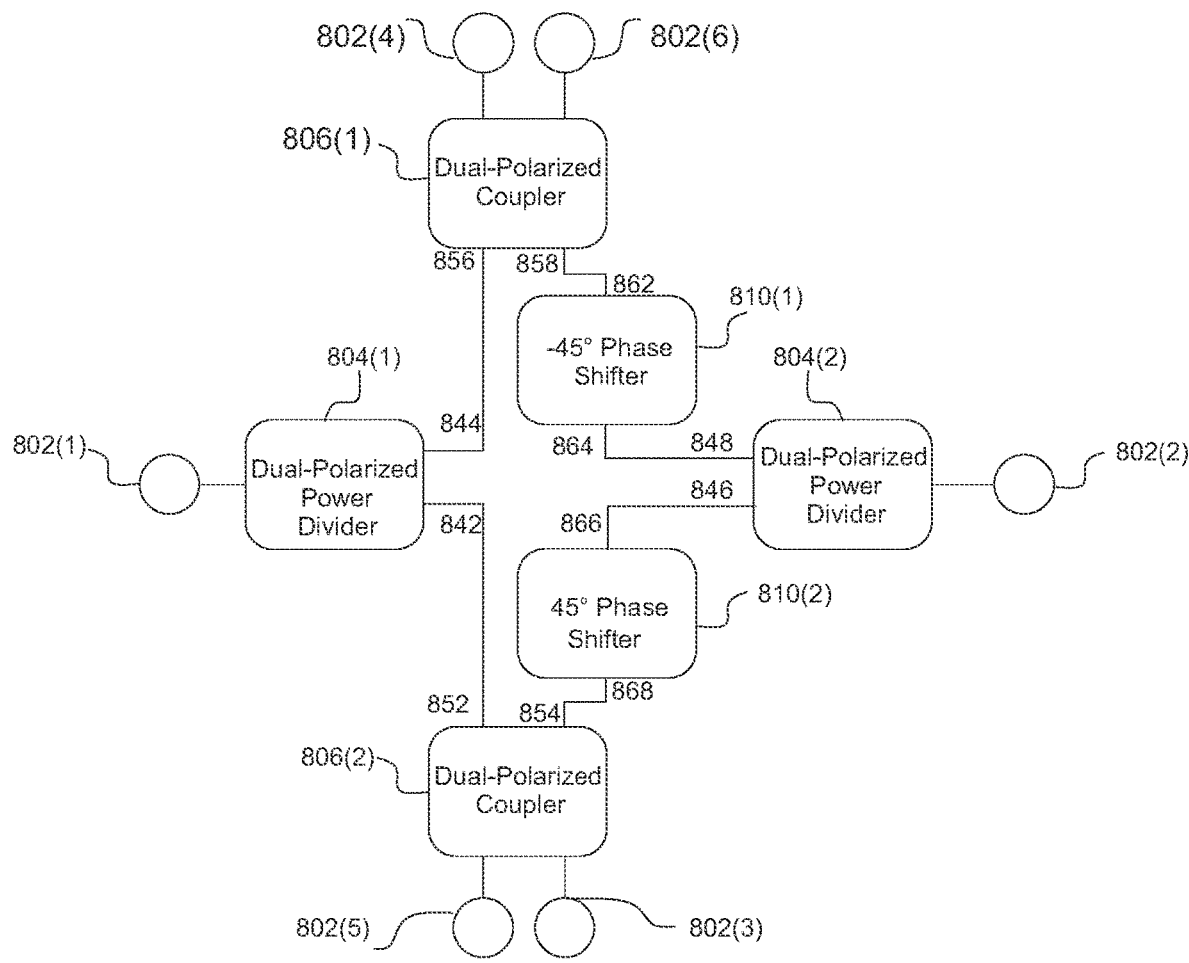
FIG. 8A is a block diagram of a dual polarized six port junction, according to example embodiments.
Figure 8B:
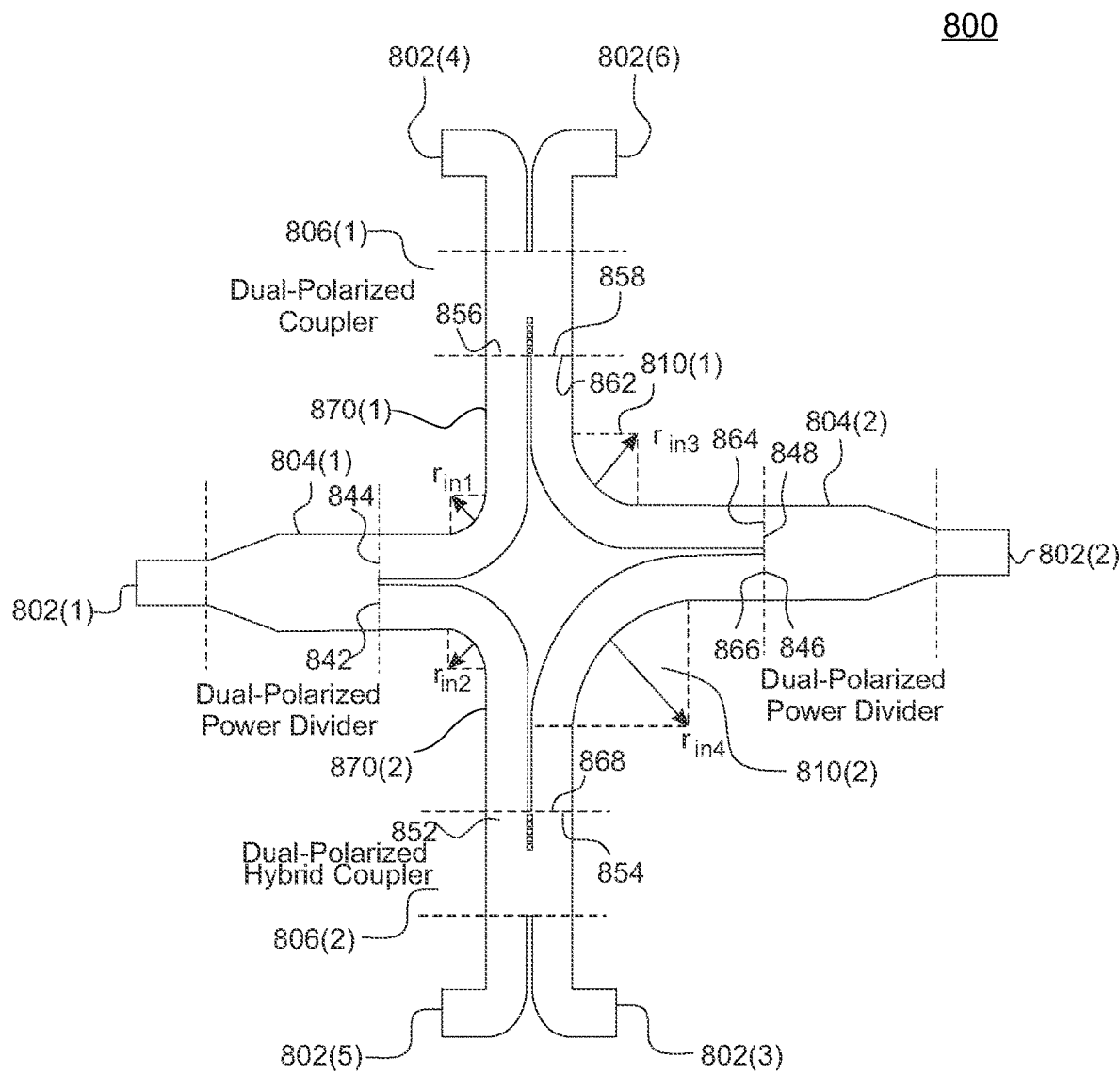
FIG. 8B is a top view of a physical embodiment of the dual polarized six port junction of FIG. 8A, according to example embodiments.

FIGS. 8A-8B illustrate embodiments of a planar dual polarized six-port junction 800 according to example embodiments. The dual polarized six-port junction 800 propagates both orthogonal polarizations of a polarized wave simultaneously.

The dual polarized six-port junction 800 includes two dual polarized power dividers 804(1) and 804(2) (generally 804), two dual polarized couplers 806(1) and 806(2) (generally 806), and two phase shifters 810(1) and 810(2). In example embodiments, the dual polarized couplers 806(1) and 806(2) are implemented using the identical structure as dual polarized 3 dB-90° coupler 502 described above. In some examples, the components of dual polarized six-port junction 800 are metal walled structures filled with a dielectric substrate that functions as the waveguide medium, and in other examples they are hollow metal walled components in which air functions as the waveguide medium.

Phase shifter 810(1) is a −45 degree phase shifter, and has a first port 862 connected to a port 858 of dual-polarized coupler 806(1), and a second port 864 that is connected to a port 848 of dual-polarized power divider 804(2). Phase shifter 810(2) is a 45 degree phase shifter, having a first port 868 connected to a port 854 of dual-polarized coupler 806(2), and a second port 866 that is connected to a port 846 of dual-polarized power divider 804(2).

In the embodiment of FIG. 8B, the phase shifters 810(1) and 810(2) are curved waveguides providing the desired phase equalization for both of the orthogonal polarizations of a signal. The phase shifters 810(1) and 810(2), the dual polarized coupler 806 (1) and 806(2) each have cross sectional waveguide sections of dimensions a×b.

Ports 844 and 842 of polarized power divider 804(1) are respectively connected to port 856 of dual polarized coupler 806(1) and port 852 of dual polarized coupler 806(2) through identical curved waveguides that have the same radius, $r_{in1}=r_{in2}$. The polarized waves output from the ports 856 and 852 thus have the same phase.

The ports 846 and 848 of the power divider 804(2) are respectively connected to the coupler 806(1) through the −45° phase shifter 810(1) and to the coupler 806(2) through the 45° phase shifter 810(2). This 90° phase difference between phase shifters 810(1) and 810(2) is implemented by using two non-identical curved waveguides with radius $r_{in3}$ and $r_{in4}$, and $r_{in3} \neq r_{in4}$.

For example, $r_{in3}$ and $r_{in4}$ which provide the 90° phase difference between phase shifters 810(1) and 810(2) for both of the $TE_{10}$ and $TE_{01}$ modes at 30 GHz operating frequency are 9.5 mm and 17.5 mm, respectively, and $r_{in1}$ and $r_{in2}$ are 5.5 mm.

In some examples, when port 802(1) is excited with the $TE_{10}$ or $TE_{01}$ mode, the magnitude of the polarized wave is divided approximately equal between port 802(3), port 802(4), port 802(5), and port 802(6), each with a −6 dB transmission level. Port 802(2) is isolated with an isolation around 20 dB and the reflections to port 802(1) is about 20 dB. Port 802(4) and port 802(5) have the same phase shift with port 802(1). Port 802(3) and port 802(6) also have the same phase shift with port 800(1). The phase difference between output ports 802(4) and 802(3) is 90 degrees.

In some examples, when port 802(2) is excited with the $TE_{10}$ or $TE_{01}$ mode, the magnitude of the polarized wave is divided approximately equal between port 802(3), port 802(4), port 802(5), and port 802(6), each with a −6 dB transmission level. Port 802(1) is isolated with an isolation around 20 dB and the reflections to port 802(1) is about 20 dB. Port 802(4) and port 802(3) have the same phase shift with port 802(1). The phase difference between output ports 802(5) and 802(6) is 180 degrees. The phase difference between output ports 802(5) and 802(3) is 90 degrees.

PSC-Based Dual-Polarized Direct Demodulator

Figure 9:
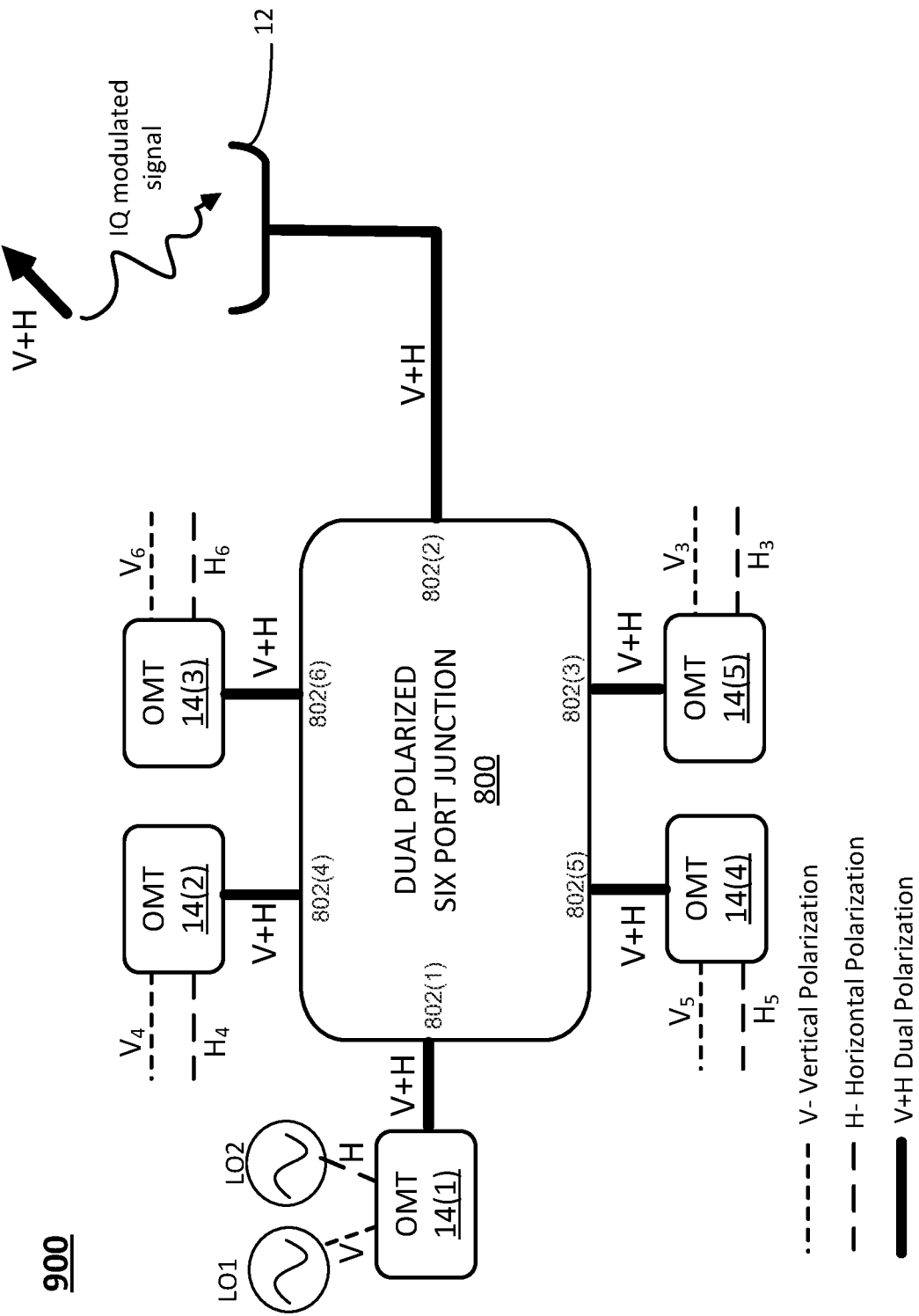
FIG. 9 is block diagram of a dual polarized direct demodulator that incorporates the dual polarized six port junction of FIG. 8A and the OMT of FIG. 2A.

FIG. 9 is a block diagram of a dual polarized direct demodulator 900 for mmW signals that incorporates PSC based dual polarized six-port junction 800 and five PSC-based OMTs 14(1) to 14(5). As seen in FIG. 9, dual polarized direct demodulator 900 includes a first OMT 14(1) with its dual polarized port connected to the first port 802(1) of six-port junction 800. The V-polarized port of OMT 14(1) is connected to local oscillator LO1, and the H-polarized port of OMT 14(1) is connected to local oscillator LO2. The second port 802(2) of six port junction 800 is connected to an X-pol antenna 12. The other 4 ports of six port junction 800 are connected to respective OMTs 14(2) to 14(5).

The six-port junction 800 functions to measure the relative magnitude and phase of the vertical and horizontal components of an arbitrary polarized wave received through X-pol antenna 12 as compared to a reference signal produced from local oscillators LO1 and LO2. This measurement is performed by measuring only the magnitude of the V and H outputs of the four OMTs 14(2) to 14(5).

As shown in FIG. 9, the two local oscillators LO1, LO2, respectively generate vertically (V) and horizontally (H) polarized reference signals. These horizontally-polarized and vertically-polarized reference signals are applied to OMT 14(1), which combines the orthogonal polarizations and delivers a combined dual polarized signal (V+H) to the dual-polarized six-port junction 800 at port 802(2). At the same time, the receiving X-pol antenna 12 receives an arbitrarily polarized signal to that is fed to the dual-polarized six-port junction 800 at port 802(2) to be demodulated. The output ports of the six-port junction 800, namely ports 802(3), 802(4), 802(5) and 802(6), each receive a dual-polarized signal (V+H). Each output port 802(3), 802(4), 802(5) and 802(6) is connected to a respective OMT 14(5), 14(20) 14(4), 14(3) in order to separate the orthogonal polarizations. From magnitude only measurements at the output of these OMTs, the complex relation between the signals at input port 802(1) and input port 802(2) can be obtained for each V and H polarization.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology

The invention claimed is:

1. A dual polarized waveguide device comprising:
a first waveguide that defines a first linear signal propagation path
a second waveguide that defines a second linear signal propagation path that is parallel to the first linear signal propagation path; and
a polarization selective coupling interface coupling the first and second waveguides, the polarization selective coupling interface being configured to enable horizontally polarized signals to pass between the first and second linear propagation paths and prevent vertically polarized signals from passing between the first and second linear propagation paths.

2. The waveguide device of claim 1 wherein the polarization selective coupling interface comprises a periodic perfect electrical conductor (PEC) wall.

3. The waveguide device of claim 2 wherein the device is an orthomode transducer (OMT) wherein cross-polarized mmW signals fed to the first waveguide are divided along the polarization selective coupling interface into vertically polarized mmW signals that are output from the first waveguide and horizontally polarized mmW signals that are output from the second waveguide.

4. The waveguide device of claim 3 wherein the horizontally polarized signals include horizontally polarized mmW signals, and the vertically polarized signals include vertically polarized mmW signals, wherein the horizontally polarized mmW signals that are fed to the second waveguide pass through the polarization selective coupling interface to combine with the vertically polarized mmW signals fed to the first waveguide to form cross-polarized mmW signals that are output from the first waveguide.

5. The waveguide device of claim 4 wherein the first waveguide and the second waveguide each include a dielectric substrate and the periodic PEC wall comprises a row of plated holes.

6. The waveguide device of claim 5 wherein the dielectric substrate of the first waveguide has the same permittivity of the dielectric substrate of the second waveguide.

7. The waveguide device of claim 5 wherein the polarization selective coupling interface further comprises a dielectric wall between the periodic PEC wall and one of the first waveguide and the second waveguide, the dielectric wall having a different permittivity than the dielectric substrate of the first waveguide and the dielectric substrate of the second waveguide.

8. The waveguide device of claim 5 wherein the waveguide device is formed from a planar printed circuit board (PCB).

9. The waveguide device of claim 4, wherein the periodic PEC wall has a length $L_c$ of approximately 22.5 mm, and the periodic PEC wall is a row of conductive elements each having a diameter of approximately 0.2 mm and a periodic spacing of approximately 0.4 mm.

10. The waveguide device of claim 4 comprising a cross-polarized antenna connected to excite the first waveguide.

11. The waveguide device of claim 4 wherein the waveguide device is a planar phase shifting device, wherein the first waveguide feeds a first delay line curved waveguide section configured to phase shift signals passing therethrough and the second waveguide feeds a second delay line curved waveguide section configured to phase shift signals passing therethrough.

12. The waveguide device of claim 2 wherein the first waveguide and the second waveguide are hollow waveguides, and the periodic PEC wall comprises a row of pins.

13. The waveguide device of claim 2 further comprising a second coupling interface coupling the first and second waveguides, the second coupling interface being configured to permit both the horizontally polarized signals and the vertically polarized signals to pass between the first and second linear propagation paths, the second coupling interface providing a coupling length of $L_{cV}$ for the vertically polarized signals between the first and second linear signal propagation paths, and the second coupling interface and the polarization selective coupling interface collectively providing a coupling length of $L_{cH}$ for the horizontally polarized signals.

14. The waveguide device of claim 13 wherein the second coupling interface contains no conductive barrier between the first and second waveguides.

15. The waveguide device of claim 14 wherein the length $L_{cH}$ and the length $L_{cV}$ permit cross-polarized signals fed to the first waveguide to split into two cross-polarized signals for output from the first waveguide and the second waveguide and cross-polarized signals fed to the second waveguide to split into two cross-polarized signals for output from the first waveguide and the second waveguide.

16. The waveguide device of claim 14 wherein the waveguide device is a cross coupling device, wherein the length $L_{cH}$ and the length $L_{cV}$ permit cross-polarized signals fed to the first waveguide to entirely or almost entirely couple from the first linear signal propagation path to the second linear signal propagation path for output from the second waveguide, and cross-polarized signals fed to the second waveguide to entirely or almost entirely couple from the second linear propagation path to the first linear propagation path for output from the first waveguide.

17. A method of guiding cross-polarized signals comprising:
    guiding the cross-polarized signals in a first linear waveguide path that is parallel to a second linear waveguide path; and
    at an interface between the first linear waveguide path and the second linear waveguide path, permitting horizontally polarized signals of the cross-polarized signals to couple from the first linear waveguide path to the second linear waveguide path and preventing vertically polarized signals of the cross-polarized signals from coupling from the first linear waveguide path to the second linear waveguide path.

18. The method of claim 17 wherein the permitting and the preventing are performed by a periodic perfect electrical conductor (PEC).

19. The method of claim 18 wherein the guiding is performed by a dielectric substrate surrounded by conductive layers.

20. The method of claim 18 comprising, at a further interface between the first linear waveguide path and the second linear waveguide path, permitting both the horizontally and vertically polarized signals of the cross-polarized signals to couple from the first linear waveguide path to the second linear waveguide path.

* * * * *